(12) United States Patent
Wakisaka et al.

(10) Patent No.: US 11,749,429 B2
(45) Date of Patent: Sep. 5, 2023

(54) NON ORIENTED ELECTRICAL STEEL SHEET, IRON CORE, MANUFACTURING METHOD OF IRON CORE, MOTOR, AND MANUFACTURING METHOD OF MOTOR

(71) Applicant: NIPPON STEEL CORPORATION, Tokyo (JP)

(72) Inventors: Takeaki Wakisaka, Tokyo (JP); Ichiro Tanaka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/077,106

(22) Filed: Dec. 7, 2022

(65) Prior Publication Data

US 2023/0110399 A1   Apr. 13, 2023

Related U.S. Application Data

(63) Continuation of application No. PCT/JP2022/029059, filed on Jul. 28, 2022.

(30) Foreign Application Priority Data

Jul. 30, 2021   (JP) .................................. 2021-126291

(51) Int. Cl.
*H01F 1/147*   (2006.01)
*C21D 8/02*   (2006.01)
*C21D 8/12*   (2006.01)
*H02K 15/03*   (2006.01)

(52) U.S. Cl.
CPC ....... *H01F 1/14775* (2013.01); *C21D 8/0247* (2013.01); *C21D 8/1244* (2013.01); *H01F 1/14716* (2013.01); *H01F 1/14791* (2013.01); *H02K 15/03* (2013.01)

(58) Field of Classification Search
CPC ............. H01F 1/14775; H01F 1/14716; H01F 1/14791; C21D 8/0247; C21D 8/1244; H02K 15/03
See application file for complete search history.

(56) References Cited

U.S. PATENT DOCUMENTS

2014/0238558 A1   8/2014   Fujikura et al.

FOREIGN PATENT DOCUMENTS

| JP | 2-232319 A | 9/1990 |
|---|---|---|
| JP | 8-88114 A | 4/1996 |
| JP | 2005-200756 A | 7/2005 |
| JP | 2011-236486 A | 11/2011 |
| JP | 5447167 B2 | 3/2014 |
| JP | 5716315 B2 | 5/2015 |
| WO | WO 2013/069754 A1 | 5/2013 |

*Primary Examiner* — Jenny R Wu
(74) *Attorney, Agent, or Firm* — Birch, Stewart, Kolasch & Birch, LLP

(57) ABSTRACT

A non oriented electrical steel sheet includes, as a chemical composition, by mass %, 1.0% or more and 5.0% or less of Si, wherein a sheet thickness is 0.10 mm or more and 0.35 mm or less, an average grain size is 30 μm or more and 200 μm or less, an X1 value defined by $X1=(2\times B_{50L}+B_{50C})/(3\times I_S)$ is less than 0.845, an E1 value defined by $E1=E_L/E_C$ is 0.930 or more, and an iron loss $W_{10/1k}$ is 80 W/kg or less.

30 Claims, 1 Drawing Sheet

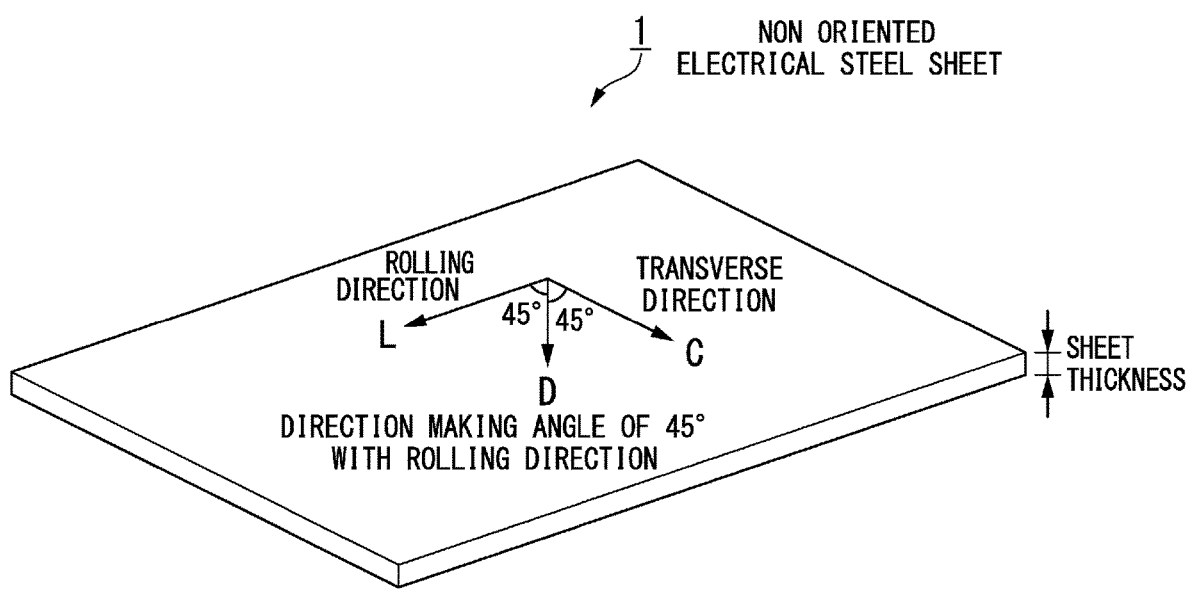

NON ORIENTED ELECTRICAL STEEL SHEET, IRON CORE, MANUFACTURING METHOD OF IRON CORE, MOTOR, AND MANUFACTURING METHOD OF MOTOR

CROSS REFERENCE TO RELATED APPLICATIONS

This application is a Continuation of PCT International Application No. PCT/JP2022/029059, filed on Jul. 28, 2022, which claims priority under 35 U.S.C. 119(a) to Patent Application No. 2021-126291, filed in Japan on Jul. 30, 2021, all of which are hereby expressly incorporated by reference into the present application.

TECHNICAL FIELD

The present invention relates to a non oriented electrical steel sheet. More specifically, the present invention relates to a non oriented electrical steel sheet, which is suitable for integrally punched iron cores of motors for electric vehicles, hybrid vehicles, or the like, an iron core, a manufacturing method of the iron core, a motor, and a manufacturing method of the motor.

Priority is claimed on Japanese Patent Application No. 2021-126291 filed on Jul. 30, 2021, the content of which is incorporated herein by reference.

Background Art

Due to a need to reduce global warming gases, products with less energy consumption have been developed in industrial fields. For instance, in a field of an automobile, there are fuel-efficient vehicles such as hybrid-driven vehicles that combine a gasoline engine and a motor, and motor-driven electric vehicles. A technology common to these fuel-efficient vehicles is a motor, and increasing an efficiency of the motor has become an important technology.

In General, a motor includes a stator and a rotor. The stator includes an iron core, and the iron core is classified as an integrally punched iron core and a segmented iron core. For the integrally punched iron core and the segmented iron core, there is a demand for a non oriented electrical steel sheet having excellent magnetic characteristics in a rolling direction (hereinafter referred to as "L direction") and in a transverse direction (hereinafter referred to as "C direction").

In addition, the motor shows excellent performance in a case where a gap between the stator and the rotor becomes smaller as an internal structure of the motor. Thus, each component of the motor is required to have a high shape accuracy. For instance, the integrally punched iron core and the segmented iron core are both formed by punching a steel sheet blank. However, in the integrally punched iron core, since the steel sheet blank is punched to be a hollow disc shape, the shape accuracy after punching may be deteriorated due to mechanical anisotropy of the steel sheet blank. In particular, the steel sheet with large magnetic anisotropy tends to show large mechanical anisotropy, so that the shape accuracy after punching may be deteriorated. For the integrally punched iron core, it is desired for the non oriented electrical steel sheet to have small mechanical anisotropy.

For instance, Patent Document 1 discloses a technique related to a non oriented electrical steel sheet having excellent magnetic characteristics. Patent Document 2 discloses a technique related to a non oriented electrical steel sheet that can improve efficiency of a motor including a segmented iron core. Patent Document 3 discloses a technique related to a non oriented electrical steel sheet having excellent magnetic characteristics.

RELATED ART DOCUMENTS

Patent Documents

[Patent Document 1] Japanese Patent (Granted) Publication No. 5447167

[Patent Document 2] Japanese Patent (Granted) Publication No. 5716315

[Patent Document 3] PCT International Publication No. WO2013/069754

SUMMARY OF INVENTION

Technical Problem to be Solved

The present invention has been made in consideration of the above mentioned situations. An object of the invention is to provide a non oriented electrical steel sheet with excellent magnetic characteristics and small mechanical anisotropy for an integrally punched iron core, an iron core, a manufacturing method of the iron core, a motor, and a manufacturing method of the motor.

Solution to Problem

An aspect of the present invention employs the following.

(1) A non oriented electrical steel sheet according to an aspect of the present invention includes a chemical composition containing, by mass %, 0.005% or less of C,
1.0% or more and 5.0% or less of Si,
less than 2.5% of sol. Al,
3.0% or less of Mn,
0.3% or less of P,
0.01% or less of S,
0.01% or less of N,
0.10% or less of B,
0.10% or less of O,
0.10% or less of Mg,
0.01% or less of Ca,
0.10% or less of Ti,
0.10% or less of V,
5.0% or less of Cr,
5.0% or less of Ni,
5.0% or less of Cu,
0.10% or less of Zr,
0.10% or less of Sn,
0.10% or less of Sb,
0.10% or less of Ce,
0.10% or less of Nd,
0.10% or less of Bi,
0.10% or less of W,
0.10% or less of Mo,
0.10% or less of Nb,
0.10% or less of Y, and
a balance consisting of Fe and impurities, wherein
a sheet thickness is 0.10 mm or more and 0.35 mm or less,
an average grain size is 30 μm or more and 200 μm or less,
an X1 value defined by the following expression 1 is less than 0.845,
an E1 value defined by the following expression 2 is 0.930 or more, and an iron loss $W_{10/1k}$ when excited so as to be a magnetic flux density of 1.0 T at a frequency of 1 kHz is 80 W/kg or less, where the expression 1 is $X1=(2\times B_{50L}+B_{50C})/(3\times I_S)$, where the expression 2 is $E1=E_L/E_C$, and where $B_{50L}$ denotes a magnetic flux density in a rolling direction when magnetized with a magnetizing force of 5000 A/m, $B_{50C}$ denotes a magnetic flux density in a transverse direction when magnetized with a magnetizing force of 5000 A/m, $I_S$ denotes a spontaneous magnetization at room temperature, $E_L$ denotes a young's modulus in the rolling direction, and $E_C$ denotes a young's modulus in the transverse direction.

(2) In the non oriented electrical steel according to (1), an E2 value defined by the following expression 3 may be 0.900 or more, where the expression 3 is $E2=(E_L+E_C)/2\times E_D$, and where $E_D$ denotes a young's modulus in a direction making an angle of 45° with the rolling direction.

(3) In the non oriented electrical steel according to (1) or (2), an X2 value defined by the following expression 4 may be 1.040 or less, where the expression 4 is $X2=(B_{50L}+B_{50C})/2\times B_{50D}$, and where $B_{50D}$ denotes a magnetic flux density in a direction making an angle of 45° with the rolling direction when magnetized with a magnetizing force of 5000 A/m.

(4) In the non oriented electrical steel according to any one of (1) to (3), the chemical composition may include, by mass %, more than 3.25% and 5.0% or less of Si.

(5) In the non oriented electrical steel according to any one of (1) to (4), the chemical composition may include, by mass %, at least one of 0.0010% or more and 0.005% or less of C,
0.10% or more and less than 2.5% of sol. Al,
0.0010% or more and 3.0% or less of Mn,
0.0010% or more and 0.3% or less of P,
0.0001% or more and 0.01% or less of S,
0.0015% or more and 0.01% or less of N,
0.0001% or more and 0.10% or less of B,
0.0001% or more and 0.10% or less of O,
0.0001% or more and 0.10% or less of Mg,
0.0003% or more and 0.01% or less of Ca,
0.0001% or more and 0.10% or less of Ti,
0.0001% or more and 0.10% or less of V,
0.0010% or more and 5.0% or less of Cr,
0.0010% or more and 5.0% or less of Ni,
0.0010% or more and 5.0% or less of Cu,
0.0002% or more and 0.10% or less of Zr,
0.0010% or more and 0.10% or less of Sn,
0.0010% or more and 0.10% or less of Sb,
0.001% or more and 0.10% or less of Ce,
0.002% or more and 0.10% or less of Nd,
0.002% or more and 0.10% or less of Bi,
0.002% or more and 0.10% or less of W,
0.002% or more and 0.10% or less of Mo,
0.0001% or more and 0.10% or less of Nb, and
0.002% or more and 0.10% or less of Y.

(6) In the non oriented electrical steel according to any one of (1) to (5), the chemical composition may include, by mass %, more than 4.0% in total of Si and sol. Al.

(7) In the non oriented electrical steel according to any one of (1) to (6), the X1 value may be 0.80 or more and less than 0.830.

(8) An iron core according to an aspect of the present invention may include the non oriented electrical steel sheet according to any one of (1) to (7).

(9) A manufacturing method of an iron core according to an aspect of the present invention may include a process of punching and stress-relief-annealing the non oriented electrical steel sheet according to any one of (1) to (7).

(10) A motor according to an aspect of the present invention may include the iron core according to (8).

(11) A manufacturing method of a motor may include a process of preparing an iron core by punching and stress-relief-annealing the non oriented electrical steel sheet according to any one of (1) to (7) and a process of assembling the motor using the iron core.

Effects of Invention

According to the above aspects of the present invention, it is possible to provide the non oriented electrical steel sheet with excellent magnetic characteristics and small mechanical anisotropy for the integrally punched iron core, the iron core, the manufacturing method of the iron core, the motor, and the manufacturing method of the motor.

BRIEF DESCRIPTION OF DRAWINGS

FIG. 1 is a schematic illustration of a non oriented electrical steel sheet according to an embodiment of the present invention.

DETAILED DESCRIPTION OF PREFERRED EMBODIMENTS

Hereinafter, a preferable embodiment of the present invention is described in detail. However, the present invention is not limited only to the configuration which is disclosed in the embodiment, and various modifications are possible without departing from the aspect of the present invention. In addition, the limitation range as described below includes a lower limit and an upper limit thereof. However, the value expressed by "more than" or "less than" does not include in the limitation range. "%" of the amount of respective elements expresses "mass %".

FIG. 1 shows a schematic illustration of a non oriented electrical steel sheet according to the embodiment of the present invention.

(Chemical Composition)

Limitation reasons of the chemical composition of the non oriented electrical steel sheet according to the present embodiment are explained.

As a chemical composition, the non oriented electrical steel sheet according to the present embodiment contains Si, optional elements as necessary, and a balance consisting of Fe and impurities. Hereinafter, each element is explained.

C: 0% or more and 0.005% or less

C (carbon) is an element contained as an impurity and deteriorates the magnetic characteristics. Thus, the C content is to be 0.005% or less. Preferably, the C content is 0.003% or less. Since it is preferable that the C content is low, a lower limit does not need to be limited, and the lower limit may be 0%. However, it is not easy to industrially control the content to be 0%, and thus, the lower limit may be more than 0% or 0.0010%.

Si: 1.0% or more and 5.0% or less

Si (silicon) is an element that is effective in increasing electrical resistivity of the steel sheet and reducing iron loss. Thus, the Si content is to be 1.0% or more. Moreover, Si is an effective element for the non oriented electrical steel sheet for the integrally punched iron core to achieve both magnetic characteristics and mechanical anisotropy. In this case, the Si content is preferably more than 3.25%, more preferably 3.27% or more, further more preferably 3.30% or more, and further more preferably 3.40% or more. On the other hand, when the Si content is excessive, a magnetic flux density deteriorates significantly. Thus, the Si content is to be 5.0% or less. The Si content is preferably 4.0% or less, and more preferably 3.5% or less.

sol. Al: 0% or more and less than 2.5%

Al (aluminum) is an optional element that is effective in increasing the electrical resistivity of the steel sheet and reducing the iron loss. However, when the content is excessive, the magnetic flux density deteriorates significantly. Thus, the sol. Al content is to be less than 2.5%. A lower limit of sol. Al does not need to be limited, and the lower limit may be 0%. In order to reliably obtain the above effect, the sol. Al content is preferably 0.10% or more. Herein, the sol. Al expresses acid-soluble aluminum.

Moreover, Si and Al are elements effective in achieving both magnetic characteristics and mechanical anisotropy. Thus, the total amount of Si and sol. Al is preferably more than 4.0%, more preferably more than 4.10%, and further more preferably more than 4.15%. On the other hand, Si and Al have a strong effect on solid solution strengthening. When the content is excessive, cold rolling becomes difficult to be performed. Thus, the total amount of Si and sol. Al is preferably less than 5.5%.

Mn: 0% or more and 3.0% or less

Mn (manganese) is an optional element that is effective in increasing the electrical resistivity of the steel sheet and reducing the iron loss. However, since an alloying cost of is higher than Si or Al, an increase in the Mn content is economically disadvantageous. Thus, the Mn content is to be 3.0% or less. Preferably, the Mn content is 2.5% or less. A lower limit of Mn does not need to be limited, and the lower limit may be 0%. In order to reliably obtain the above effect, the Mn content is preferably 0.0010% or more, and more preferably 0.010% or more.

P: 0% or more and 0.3% or less

P (phosphorus) is an element generally contained as an impurity. However, P has an effect in improving texture of the non oriented electrical steel sheet and thereby improving the magnetic characteristics. Thus, P may be included as necessary. However, P is a solid solution strengthening element. When the P content is excessive, the steel sheet is hardened and thereby the cold rolling becomes difficult to be performed. Thus, the P content is to be 0.3% or less. The P content is preferably 0.2% or less. A lower limit of P does not need to be limited, and the lower limit may be 0%. In order to reliably obtain the above effect, the P content is preferably 0.0010% or more, and more preferably 0.015% or more.

S: 0% or more and 0.01% or less

S (sulfur) is contained as an impurity and forms fine MnS by bonding to Mn in steel. As a result, S suppresses grain growth during annealing and deteriorates the magnetic characteristics of the non oriented electrical steel sheet. Thus, the S content is to be 0.01% or less. The S content is preferably 0.005% or less, and more preferably 0.003% or less. Since it is preferable that the S content is low, a lower limit does not need to be limited, and the lower limit may be 0%. However, it is not easy to industrially control the content to be 0%, and thus, the lower limit may be 0.0001%.

N: 0% or more and 0.01% or less

N (nitrogen) is contained as an impurity and forms fine AlN by bonding to Al in steel. As a result, N suppresses the grain growth during annealing and deteriorates the magnetic characteristics. Thus, the N content is to be 0.01% or less.

The N content is preferably 0.005% or less, and more preferably 0.003% or less. Since it is preferable that the N content is low, a lower limit does not need to be limited, and the lower limit may be 0%. However, it is not easy to industrially control the content to be 0%, and thus, the lower limit may be 0.0001% or more, may be more than 0.0015%, or may be 0.0025% or more.

Sn: 0% or more and 0.10% or less

Sb: 0% or more and 0.10% or less

Sn (tin) and Sb (antimony) are optional elements having effect in improving the texture of the non oriented electrical steel sheet and thereby improving the magnetic characteristics (for instance, magnetic flux density). Thus, Sn and Sb may be included as necessary. However, when the content is excessive, the steel may become brittle and fracture may occur during cold rolling. Moreover, the magnetic characteristics are deteriorated. Thus, the Sn content and the Sb content are to be 0.10% or less, respectively. Lower limits of Sn and Sb do not need to be limited, and the lower limits may be 0%. In order to reliably obtain the above effect, the Sn content is preferably 0.0010% or more, and more preferably 0.01% or more. Moreover, the Sb content is preferably 0.0010% or more, more preferably 0.002% or more, further more preferably 0.01% or more, and further more preferably more than 0.025%.

Ca: 0% or more and 0.01% or less

Ca (calcium) is an optional element that suppresses precipitation of fine sulfides (MnS, $Cu_2S$, or the like) by forming coarse sulfides. When the Ca content is favorable, inclusions are controlled, the grain growth is improved during annealing, and thereby, the magnetic characteristics (for instance, iron loss) are improved. However, when the content is excessive, the effect thereof is saturated, and the cost increases. Thus, the Ca content is to be 0.01% or less. The Ca content is preferably 0.008% or less, and more preferably 0.005% or less. A lower limit of Ca does not need to be limited, and the lower limit may be 0%. In order to reliably obtain the above effect, the Ca content is preferably 0.0003% or more. The Ca content is preferably 0.001% or more, and more preferably 0.003% or more.

Cr: 0% or more and 5.0% or less

Cr (chromium) is an optional element that increases the electrical resistivity and improves the magnetic characteristics (for instance, iron loss). However, when the content is excessive, a saturation magnetic flux density may decrease, the effect thereof is saturated, and the cost increases. Thus, the Cr content is to be 5.0% or less. The Cr content is preferably 0.5% or less, and more preferably 0.1% or less. A lower limit of Cr does not need to be limited, and the lower limit may be 0%. In order to reliably obtain the above effect, the Cr content is preferably 0.0010% or more.

Ni: 0% or more and 5.0% or less

Ni (nickel) is an optional element that improves the magnetic characteristics (for instance, saturation magnetic flux density). However, when the content is excessive, the effect thereof is saturated, and the cost increases. Thus, the Ni content is to be 5.0% or less. The Ni content is preferably 0.5% or less, and more preferably 0.1% or less. A lower limit of Ni does not need to be limited, and the lower limit may be 0%. In order to reliably obtain the above effect, the Ni content is preferably 0.0010% or more.

Cu: 0% or more and 5.0% or less

Cu (copper) is an optional element that improves strength of the steel sheet. However, when the content is excessive, the saturation magnetic flux density may decrease, the effect thereof is saturated, and the cost increases. Thus, the Cu content is to be 5.0% or less. The Cu content is preferably 0.1% or less. A lower limit of Cu does not need to be limited, and the lower limit may be 0%. In order to reliably obtain the above effect, the Cu content is preferably 0.0010% or more.

Ce: 0% or more and 0.10% or less

Ce (cerium) is an optional element that suppresses the precipitation of fine sulfides (MnS, $Cu_2S$, or the like) by forming coarse sulfides coarse oxysulfides, or the like. As a result, the grain growth is improved, and the iron loss is improved. However, when the content is excessive, the iron loss may be deteriorated by forming oxides in addition to sulfides and oxysulfides, and the effect thereof is saturated, and the cost increases. Thus, the Ce content is to be 0.10% or less. The Ce content is preferably 0.01% or less, more preferably 0.009% or less, and further more preferably 0.008% or less. A lower limit of Ce does not need to be limited, and the lower limit may be 0%. In order to reliably obtain the above effect, the Ce content is preferably 0.001% or more. The Ce content is more preferably 0.002% or more, more preferably 0.003% or more, and further more preferably 0.005% or more.

In addition to the above elements, the non oriented electrical steel sheet according to the present embodiment may contain, as a chemical composition, the optional elements such as B, 0, Mg, Ti, V, Zr, Nd, Bi, W, Mo, Nb, and Y. Amounts of these optional elements may be controlled on the basis of known knowledge. For instance, the amounts of these optional elements may be as follows.

B: 0% or more and 0.10% or less
O: 0% or more and 0.10% or less
Mg: 0% or more and 0.10% or less
Ti: 0% or more and 0.10% or less
V: 0% or more and 0.10% or less
Zr: 0% or more and 0.10% or less
Nd: 0% or more and 0.10% or less
Bi: 0% or more and 0.10% or less
W: 0% or more and 0.10% or less
Mo: 0% or more and 0.10% or less
Nb: 0% or more and 0.10% or less
Y: 0% or more and 0.10% or less Moreover, the non oriented electrical steel sheet according to the present embodiment may contain, as a chemical composition, by mass %, at least one of 0.0010% or more and 0.005% or less of C,
0.10% or more and less than 2.5% of sol. Al,
0.0010% or more and 3.0% or less of Mn,
0.0010% or more and 0.3% or less of P,
0.0001% or more and 0.01% or less of S,
0.0015% or more and 0.01% or less of N,
0.0001% or more and 0.10% or less of B,
0.0001% or more and 0.10% or less of O,
0.0001% or more and 0.10% or less of Mg,
0.0003% or more and 0.01% or less of Ca,
0.0001% or more and 0.10% or less of Ti,
0.0001% or more and 0.10% or less of V,
0.0010% or more and 5.0% or less of Cr,
0.0010% or more and 5.0% or less of Ni,
0.0010% or more and 5.0% or less of Cu,
0.0002% or more and 0.10% or less of Zr,
0.0010% or more and 0.10% or less of Sn,
0.0010% or more and 0.10% or less of Sb,
0.001% or more and 0.10% or less of Ce,
0.002% or more and 0.10% or less of Nd,
0.002% or more and 0.10% or less of Bi,
0.002% or more and 0.10% or less of W,
0.002% or more and 0.10% or less of Mo,
0.0001% or more and 0.10% or less of Nb, and
0.002% or more and 0.10% or less of Y.

The B content is preferably 0.01% or less, the 0 content is preferably 0.01% or less, the Mg content is preferably 0.005% or less, the Ti content is preferably 0.002% or less, the V content is preferably 0.002% or less, the Zr content is preferably 0.002% or less, the Nd content is preferably 0.01% or less, the Bi content is preferably 0.01% or less, the W content is preferably 0.01% or less, the Mo content is preferably 0.01% or less, the Nb content is preferably 0.002% or less, and the Y content is preferably 0.01% or less. Moreover, the Ti content is preferably 0.001% or more, the V content is preferably 0.002% or more, and the Nb content is preferably 0.002% or more.

The chemical composition as described above may be measured by typical analytical methods for the steel. For instance, the chemical composition may be measured by using ICP-AES (Inductively Coupled Plasma-Atomic Emission Spectrometer: inductively coupled plasma emission spectroscopy spectrometry). Herein, the acid soluble Al may be measured by ICP-AES using filtrate after heating and dissolving the sample in acid. In addition, C and S may be measured by the infrared absorption method after combustion, N may be measured by the thermal conductometric method after fusion in a current of inert gas, and O may be measured by, for instance, the non-dispersive infrared absorption method after fusion in a current of inert gas.

The above chemical composition is that of the non oriented electrical steel sheet without insulation coating. When the non oriented electrical steel sheet to be the measurement sample has the insulation coating and the like on the surface, the chemical composition is measured after removing the coating. For instance, the insulation coating may be removed by the following method. First, the non oriented electrical steel sheet having the insulation coating and the like is immersed in sodium hydroxide aqueous solution, sulfuric acid aqueous solution, and nitric acid aqueous solution in this order. The steel sheet after the immersion is washed. Finally, the steel sheet is dried with warm air. Thereby, it is possible to obtain the non oriented electrical steel sheet from which the insulation coating is removed. Alternatively, the insulation coating may be removed by grinding.

(Magnetic Characteristics)

As the magnetic flux density, an X1 value defined by the following expression 1 is to be less than 0.845. In order to improve the magnetic characteristics, the X value is preferably 0.820 or more.

$$X1=(2 \times B_{50L}+B_{50C})/(3 \times I_S) \qquad \text{Expression 1:}$$

Herein, $B_{50L}$ denotes the magnetic flux density in a rolling direction when magnetized with magnetizing force of 5000 A/m, $B_{50C}$ denotes the magnetic flux density in a transverse direction when magnetized with magnetizing force of 5000 A/m, and $I_S$ denotes spontaneous magnetization at room temperature.

$I_S$ in the expression 1 may be obtained by the following expression 5 and expression 6. The expression 5 is for obtaining the spontaneous magnetization assuming that the spontaneous magnetization of the steel sheet is simply attenuated by elements other than Fe. Density of the steel sheet in the expression 5 may be measured on the basis of JIS Z 8807:2012. In a case where the insulation coating is applied, the density may be measured by the above described method under condition such that the insulation coating exists, and the same value of the density is also used at the time of evaluating the magnetic characteristics described later. Density of Fe in the expression 5 may be 7.873 g/cm$^3$.

$$I_S=2.16\times\{(\text{density of steel sheet})/(\text{density of Fe})\}\times[\text{Fe content (mass \%)}]/100 \quad \text{Expression 5:}$$

Fe content (mass %)=100 (mass %)−[total amount (mass %) of C, Si, Mn, sol. Al, P, S, N, B, O, Mg, Ca, Ti, V, Cr, Ni, Cu, Zr, Sn, Sb, Ce, Nd, Bi, W, Mo, Nb, and Y]    Expression 6:

In order to achieve both magnetic characteristics and mechanical anisotropy as the non oriented electrical steel sheet for the integrally punched iron core, the X1 value is preferably less than 0.840, more preferably less than 0.835, and further more preferably less than 0.830. Although a lower limit of the X1 value does not need to be limited, the lower limit may be 0.80 as necessary.

Moreover, an X2 value defined by the following expression 4 is preferably 1.040 or less.

$$X2=(B_{50L}+B_{50C})/2\times B_{50D} \quad \text{Expression 4:}$$

Herein, $B_{50D}$ denotes a magnetic flux density in a direction making an angle of 45° with the rolling direction when magnetized with a magnetizing force of 5000 A/m.

When the X2 value is 1.040 or less, it can be judged that the magnetic anisotropy is favorably small and a roundness for motor is secured. The X2 value is preferably 1.038 or less, and is more preferably 1.036 or less. Although a lower limit of the X2 value does not need to be limited, the lower limit may be 1.030 as necessary.

As the iron loss, an iron loss $W_{10/1k}$ when excited so as to have the magnetic flux density of 1.0 T at frequency of 1 kHz is to be 80 W/kg or less. The iron loss $W_{10/1k}$ is preferably 70 W/kg or less, and more preferably 49 W/kg or less. Although a lower limit of the iron loss $W_{10/1k}$ does not need to be limited, the lower limit may be 30 W/kg as necessary.

The magnetic characteristics may be measured on the basis of the single sheet tester (SST) method regulated by JIS C 2556: 2015. Instead of taking a test piece with size regulated by JIS, a test piece with smaller size, for instance, a test piece of width 55 mm×length 55 mm, may be taken and measured on the basis of the single sheet tester. In a case where the test piece of width 55 mm×length 55 mm is hardly taken, the measurement based on the single sheet tester may be performed using two test pieces of width 8 mm×length 16 mm as a test piece of width 16 mm×length 16 mm. At that time, it is preferable to use an Epstein equivalent value which is converted so as to correspond to a measurement value with an Epstein tester regulated in JIS C 2550:2011. The magnetic characteristics may be a value after stress-relief-annealing.

(Average Grain Size)

When grain size is excessively coarse or fine, the iron loss under high frequency may deteriorates. Thus, the average grain size is to be 30 μm) or more and 200 μm or less. The average grain size may be a value after stress-relief-annealing.

The average grain size may be measured on the basis of an intercept method regulated by JIS G 0551:2020. For instance, in a longitudinal sectional micrograph, an average value of grain sizes may be measured by the intercept method along sheet thickness direction and rolling direction. As the longitudinal sectional micrograph, an optical micrograph may be used, and for instance, a micrograph obtained at a magnification of 50-fold may be used.

(Sheet Thickness)

Sheet thickness is to be 0.35 mm or less. The sheet thickness is preferably 0.30 mm or less. On the other hand, when the sheet thickness is excessively thin, productivity of the steel sheet and motor deteriorates significantly. Thus, the sheet thickness is to be 0.10 mm or more. The sheet thickness is preferably 0.15 mm or more.

The sheet thickness may be measured by a micrometer. When the non oriented electrical steel sheet to be the measurement sample has the insulation coating and the like on the surface, the sheet thickness is measured after removing the coating. The method for removing the insulation coating is as described above.

(Mechanical Anisotropy)

As mechanical anisotropy, an E1 value defined by the following expression 2 is 0.930 or more.

$$E1=E_L/E_C \quad \text{Expression 2:}$$

Herein, $E_L$ denotes a young's modulus in the rolling direction, and $E_C$ denotes a young's modulus in the transverse direction.

When the E1 value is 0.930 or more, a decrease in shape accuracy after punching is suppressed, and for instance, the roundness after punching to be true circle is improved. The E1 value is preferably 0.940 or more, and is more preferably 0.950 or more. Although an upper limit of the E1 value does not need to be limited, the upper limit may be 1.00 as necessary.

Moreover, an E2 value defined by the following expression 3 is preferably 0.900 or more.

$$E2=(E_L+E_C)/2\times E_D \quad \text{Expression 3:}$$

Herein, $E_D$ denotes a young's modulus in a direction making an angle of 45° with the rolling direction.

When the E2 value is 0.900 or more, a decrease in shape accuracy after punching is suppressed, and for instance, the roundness after punching to be true circle is improved. The E2 value is preferably 0.905 or more, and is more preferably 0.910 or more. Although an upper limit of the E2 value does not need to be limited, the upper limit may be 1.10 as necessary.

In general, as measurement of young's modulus, three methods (mechanical test method, resonance method, ultrasonic pulse method) are used. In the present embodiment, the young's modulus may be measured by the mechanical test method. For instance, the young's modulus E may be calculated by applying a tensile load to a test piece with bar shape or sheet shape in a tensile test and by measuring a displacement thereat. For instance, relationship between load and displacement may be measured at room temperature. A size of the test piece is not limited. For instance, a micro tensile test piece of 1.9 mm×3.6 mm may be used.

$$E=(\sigma_{n+1}-\sigma_n)/(\varepsilon_{n+1}\varepsilon_n) \quad (1):$$

$$\sigma=P/S_0 \quad (2):$$

$$\varepsilon=(Y_{n+1}-Y_n)/l\times100 \quad (3):$$

Herein,

E denotes the young's modulus (N/m$^2$),

σ denotes tensile stress (N/m$^2$),

ε denotes tensile strain, $\sigma_{n+1}-\sigma_n$ denotes an amount of change in the tensile stress when the tensile load is changed (N/m$^2$), $\varepsilon_{n+1}-\varepsilon_n$ denotes an amount of change in the tensile strain when the tensile load is changed, P denotes the tensile load (N), $S_0$ denotes an initial cross-sectional area of the test piece (m$^2$), $Y_{n+1}-Y_n$ denotes an amount of change in a gauge length when the tensile load is changed (mm), and l denotes the gauge length (mm)

Moreover, when the roundness is 0.020% or less, the shape accuracy of the punched piece can be regarded as high. As a result, when it is used for the motor, an increase in cogging torque and an increase in vibration noise can be favorably suppressed. The above roundness is preferably 0.019% or less. Although a lower limit of the roundness does not need to be limited, the lower limit may be 0% as necessary.

For instance, in JIS B 0621: 1984, the roundness is defined as a degree of deviation of a circular shape from a geometrically correct circle. Moreover, the roundness is described as difference in radii between two circles where a distance between two concentric circles becomes minimum in a case where a circular shape is put between two concentric geometric circles.

In the present embodiment, the roundness may be regarded as a ratio obtained by dividing difference between maximum and minimum diameters of circle by an average diameter. The maximum diameter of circle corresponds to a diameter of larger circle of the above two concentric circles. The minimum diameter of circle corresponds to a diameter of smaller circle of the above two concentric circles. The average diameter is an average of the maximum and minimum diameters of circle. Thus, the roundness according to the present embodiment corresponds to a ratio obtained by dividing the difference in radii between two circles (difference in radii between two circles where a distance between two concentric circles becomes minimum) disclosed in JIS B 0621: 1984 by an average radius of two circles.

As an instance, five test pieces with disc shape of a diameter φ60 mm are punched out from the non oriented electrical steel sheet using die, each roundness is measured, and then, an average of five test pieces is regarded as the roundness thereof.

The non oriented electrical steel sheet according to the present embodiment is excellent in both the magnetic characteristics and the roundness for the integrally punched iron core. For instance, the non oriented electrical steel sheet according to the present embodiment satisfies the X1 value of less than 0.845, the iron loss $W_{10/1k}$ of 80 W/kg or less, and the E1 value of 0.930 or more, and as a result, it is possible to obtain the effect such that the roundness is excellent.

(Iron Core and Motor)

Since the non oriented electrical steel sheet according to the present embodiment has excellent magnetic characteristics and small mechanical anisotropy, it is suitable for the integrally punched iron core of motor for electric vehicles, hybrid vehicles, or the like. Thus, an iron core including the non oriented electrical steel sheet according to the present embodiment exhibits excellent performance. Moreover, since the non oriented electrical steel sheet according to the present embodiment is suitable for the integrally punched iron core, a motor including the iron core exhibits excellent performance.

(Manufacturing Method)

Hereinafter, an instance of a manufacturing method of the non oriented electrical steel sheet according to the present embodiment is explained below. The non oriented electrical steel sheet according to the present embodiment is not particularly limited in the manufacturing method as long as the above features are included. The following manufacturing method is an instance for manufacturing the non oriented electrical steel sheet according to the present embodiment and a favorable manufacturing method of the non oriented electrical steel sheet according to the present embodiment.

For instance, the manufacturing method of the non oriented electrical steel sheet according to the present embodiment includes the following processes.

(A) A cold rolling process of subjecting a hot rolled steel sheet having the chemical composition described above to cold rolling under conditions such that a rolling reduction is 10% or larger and 99% or smaller to obtain a sheet thickness of 0.10 mm or more and 0.35 mm or less.

(B) A final annealing process of subjecting the cold rolled steel sheet obtained in the cold rolling process to final annealing under conditions such that an average heating rate from room temperature to 650° C. is 5 ° C./second or faster and 20 ° C./second or slower, an average heating rate from 650° C. to final annealing temperature is faster than 20° C./second and 100° C./second or slower, and the final annealing temperature is 720° C. or higher and 780° C. or lower.

Each process is explained below.

(Cold Rolling Process)

In the cold rolling process, the hot rolled steel sheet having the above chemical composition is subjected to cold rolling at the rolling reduction (cumulative rolling reduction) of 10% or larger and 99% or smaller to obtain the sheet thickness of 0.10 mm or more and 0.35 mm or less.

When the rolling reduction in the cold rolling process is smaller than 10%, the intended magnetic characteristics and mechanical anisotropy may not be obtained. When the rolling reduction is 99% or smaller, industrially stable production is possible for the non oriented electrical steel sheet. Thus, the rolling reduction in the cold rolling process is to be 10% or larger and 99% or smaller.

The sheet thickness is to be 0.10 mm or more and 0.35 mm or less. The sheet thickness is preferably 0.15 mm or more and 0.30 mm or less.

Conditions of the cold rolling other than the above, such as a steel sheet temperature during cold rolling and a diameter of the rolling roll, are not particularly limited, and are appropriately selected depending on the chemical composition of the hot rolled steel sheet, the intended sheet thickness of the steel sheet, or the like. The steel sheet may be subjected to intermediate annealing at an interval of cold rolling as necessary. However, in the present embodiment, it is possible to easily obtain the intended magnetic properties and mechanical anisotropy in a case where the intermediate annealing is not performed.

In general, the hot rolled steel sheet is subject to cold rolling after a scale formed on a surface of the steel sheet during hot rolling is removed by pickling. As described later, in a case where the hot rolled steel sheet is subjected to hot-band annealing, the hot rolled steel sheet may be pickled either before the hot-band annealing or after the hot-band annealing.

(Final Annealing Process)

In the final annealing process, the cold rolled steel sheet obtained in the cold rolling process is subjected to final annealing under conditions such that the average heating rate from room temperature to 650° C. is 5 ° C./second or faster and 20 ° C./second or slower, the average heating rate from 650° C. to the final annealing temperature is faster than 20 ° C./second and 100 ° C./second or slower, and the final annealing temperature is 720° C. or higher and 780° C. or lower.

When the above conditions are not satisfied in the final annealing process, the intended magnetic characteristics and mechanical anisotropy may not be obtained. Conditions of the final annealing other than the above are not particularly limited.

The final annealing time for retaining the cold rolled steel sheet in the temperature range of 720° C. or higher and 780° C. or lower may not be particularly specified, but it is preferably 1 second or longer to more reliably obtain favorable magnetic characteristics. On the other hand, from a productive standpoint, the final annealing time is preferably 120 seconds or shorter.

(Hot-Band Annealing Process)

The hot rolled steel sheet to be subjected to the cold rolling process may be subjected to hot-band annealing. When the hot rolled steel sheet is subjected to hot-band annealing, it is possible to obtain favorable magnetic characteristics.

The hot-band annealing may be performed by either box annealing or continuous annealing. When the box annealing is performed, the hot rolled steel sheet is preferably retained in a temperature range of 700° C. or higher and 900° C. or lower for 60 minutes or longer and 20 hours (1200 minutes) or shorter. When the continuous annealing is performed, the hot rolled steel sheet is preferably retained in a temperature range of 900° C. or higher and 1100° C. or lower for 1 second (0.0167 minutes) or longer and 600 seconds (10 minutes) or shorter.

Conditions of the hot-band annealing other than the above are not particularly limited.

(Hot Rolling Process)

The hot rolled steel sheet to be subjected to the cold rolling process can be obtained by subjecting a steel ingot or steel piece (hereinafter referred to as "slab") having the above chemical composition to hot rolling.

In the hot rolling, a steel having the above chemical composition is made into the slab by typical methods such as continuous casting or blooming the steel ingot. The slab is put into a heating furnace and then subjected to hot rolling. At this time, when the slab temperature is high, the hot rolling may be performed without putting the slab into the heating furnace.

Conditions of the hot-band annealing are not particularly limited.

(Other Processes)

After the final annealing process, a coating process of applying an insulation coating including only an organic component, only an inorganic component, or an organic-inorganic compound to a surface of the steel sheet may be performed by typical methods. From a standpoint of reducing an environmental load, an insulation coating that does not include chromium may be applied. Moreover, the coating process may be a process of applying an insulation coating that is adhesiveness by heating and pressurizing. As coating material exhibiting adhesiveness, an acrylic resin, a phenol resin, an epoxy resin, a melamine resin, or the like can be used.

Moreover, the non oriented electrical steel sheet according to this embodiment is often subjected to punching. For instance, the stress relief annealing may be performed after punching. Conditions of the stress relief annealing are not particularly limited. For instance, the stress relief annealing may be performed at a temperature range of 750° C. or higher and 850° C. or lower for 60 minutes or longer and 150 minutes or shorter.

(Manufacturing Method of Iron Core and Manufacturing Method of Motor)

An integrally punched iron core may be manufactured using the non oriented electrical steel sheet according to the present embodiment obtained as described above. A manufacturing method of the iron core may include a process of punching and stress-relief-annealing the above non oriented electrical steel sheet. Moreover, a motor may be manufactured using the integrally punched iron core. A manufacturing method of the motor may include a process of preparing an iron core by punching and stress-relief-annealing the above non oriented electrical steel sheet, and a process of assembling the motor using the iron core.

EXAMPLES

The effects of an aspect of the present invention are described in detail with reference to the following examples. However, the condition in the examples is an example condition employed to confirm the operability and the effects of the present invention, so that the present invention is not limited to the example condition. The present invention can employ various types of conditions as long as the conditions do not depart from the scope of the present invention and can achieve the object of the present invention. Hereinafter, the present invention is explained in detail with reference to examples and comparative examples.

Non oriented electrical steel sheets were prepared by performing each process under the conditions shown in Tables 1 to 16 using slabs whose chemical compositions were adjusted. Moreover, in a case where hot-band annealing was not performed, pickling was performed after hot rolling. In a case where hot-band annealing was performed, pickling for Test No. 1, 7, and 19 was performed before the hot-band annealing, and pickling for the others was performed after the hot-band annealing. Moreover, a retention time of the final annealing was 30 seconds. Moreover, stress relief annealing was performed as necessary.

A chemical composition, a sheet thickness, an average grain size, an X1 value and an X2 value related to a magnetic flux density, an iron loss $W_{10/1k}$, an E1 value and an E2 value related to a young's modulus, and a roundness of the prepared non oriented electrical steel sheet were measured. Measurement methods thereof are as described above. The average grain size and the magnetic characteristics of the stress-relief-annealed steel sheet were evaluated after stress-relief-annealing. Measurement results are shown in Tables 1 to 16. Herein, a chemical composition of the prepared non oriented electrical steel sheet was substantially the same as a chemical composition of the slab. The element represented by "–" in the table indicates that it was not consciously controlled and prepared. Moreover, the Si content indicated by "3.3" in the table was more than 3.25%. Moreover, the manufacturing condition represented by "–" in the table indicates that it was not controlled. Moreover, a sheet thickness of the prepared non oriented electrical steel sheet was the same as a final sheet thickness after cold rolling process.

As shown in Tables 1 to 16, among Test Nos. 1 to 106, inventive examples were excellent in the magnetic characteristics and the mechanical anisotropy as the non oriented electrical steel sheet. On the other hand, among Test Nos. 1 to 106, comparative examples were not excellent in at least one of the magnetic characteristics and the mechanical anisotropy.

TABLE 1

MANUFACTURING RESULTS
STEEL CHEMICAL COMPOSITION (UNIT: mass %, BALANCE CONSISTING OF Fe AND IMPURTIES)

| No. | TYPE | C | Si | Mn | sol. Al | P | S | N | B | O | Mg | Ca | Ti | V | Cr | Ni |
|---|---|---|---|---|---|---|---|---|---|---|---|---|---|---|---|---|
| 1 | S1 | 0.002 | 1.8 | 0.2 | 2.3 | 0.01 | 0.003 | 0.002 | — | 0.002 | — | — | 0.001 | — | — | — |
| 2 | S1 | 0.002 | 1.8 | 0.2 | 2.3 | 0.01 | 0.003 | 0.002 | — | 0.002 | — | — | 0.001 | — | — | — |
| 3 | S1 | 0.002 | 1.8 | 0.2 | 2.3 | 0.01 | 0.003 | 0.002 | — | 0.002 | — | — | 0.001 | — | — | — |
| 4 | S1 | 0.002 | 1.8 | 0.2 | 2.3 | 0.01 | 0.003 | 0.002 | — | 0.002 | — | — | 0.001 | — | — | — |
| 5 | S1 | 0.002 | 1.8 | 0.2 | 2.3 | 0.01 | 0.003 | 0.002 | — | 0.002 | — | — | 0.001 | — | — | — |
| 6 | S1 | 0.002 | 1.8 | 0.2 | 2.3 | 0.01 | 0.003 | 0.002 | — | 0.002 | — | — | 0.001 | — | — | — |
| 7 | S1 | 0.002 | 1.8 | 0.2 | 2.3 | 0.01 | 0.003 | 0.002 | — | 0.002 | — | — | 0.001 | — | — | — |
| 8 | S1 | 0.002 | 1.8 | 0.2 | 2.3 | 0.01 | 0.003 | 0.002 | — | 0.002 | — | — | 0.001 | — | — | — |
| 9 | S1 | 0.002 | 1.8 | 0.2 | 2.3 | 0.01 | 0.003 | 0.002 | — | 0.002 | — | — | 0.001 | — | — | — |
| 10 | S1 | 0.002 | 1.8 | 0.2 | 2.3 | 0.01 | 0.003 | 0.002 | — | 0.002 | — | — | 0.001 | — | — | — |
| 11 | S2 | 0.002 | 2.0 | 2.0 | 2.0 | 0.01 | 0.003 | 0.002 | — | 0.002 | — | — | 0.001 | — | — | — |
| 12 | S3 | 0.002 | 2.9 | 0.2 | 1.1 | 0.01 | 0.001 | 0.002 | — | 0.002 | — | — | 0.001 | — | — | — |
| 13 | S4 | 0.002 | 2.0 | 0.2 | 1.0 | 0.08 | 0.003 | 0.002 | — | 0.002 | — | — | 0.001 | — | — | — |
| 14 | S5 | 0.002 | 2.3 | 1.2 | 1.7 | 0.01 | 0.003 | 0.002 | — | 0.002 | — | — | 0.001 | — | — | — |
| 15 | S6 | 0.002 | 2.3 | 1.2 | 1.7 | 0.01 | 0.003 | 0.002 | — | 0.002 | — | 0.003 | 0.001 | — | — | — |
| 16 | S7 | 0.002 | 2.3 | 1.2 | 1.7 | 0.01 | 0.003 | 0.002 | — | 0.002 | — | — | 0.001 | — | — | — |
| 17 | S8 | 0.002 | 2.3 | 1.2 | 1.7 | 0.01 | 0.003 | 0.002 | — | 0.002 | 0.003 | — | 0.001 | — | — | — |
| 18 | S2 | 0.002 | 2.0 | 2.0 | 2.0 | 0.01 | 0.003 | 0.002 | — | 0.002 | — | — | 0.001 | — | — | — |
| 19 | S2 | 0.002 | 2.0 | 2.0 | 2.0 | 0.01 | 0.003 | 0.002 | — | 0.002 | — | — | 0.001 | — | — | — |
| 20 | S2 | 0.002 | 2.0 | 2.0 | 2.0 | 0.01 | 0.003 | 0.002 | — | 0.002 | — | — | 0.001 | — | — | — |
| 21 | S9 | 0.002 | 3.0 | 0.2 | 0.5 | 0.01 | 0.001 | 0.002 | — | 0.002 | — | — | 0.001 | — | — | — |
| 22 | S9 | 0.002 | 3.0 | 0.2 | 0.5 | 0.01 | 0.001 | 0.002 | — | 0.002 | — | — | 0.001 | — | — | — |
| 23 | S9 | 0.002 | 3.0 | 0.2 | 0.5 | 0.01 | 0.001 | 0.002 | — | 0.002 | — | — | 0.001 | — | — | — |
| 24 | S9 | 0.002 | 3.0 | 0.2 | 0.5 | 0.01 | 0.001 | 0.002 | — | 0.002 | — | — | 0.001 | — | — | — |
| 25 | S9 | 0.002 | 3.0 | 0.2 | 0.5 | 0.01 | 0.001 | 0.002 | — | 0.002 | — | — | 0.001 | — | — | — |
| 26 | S9 | 0.002 | 3.0 | 0.2 | 0.5 | 0.01 | 0.001 | 0.002 | — | 0.002 | — | — | 0.001 | — | — | — |

TABLE 2

MANUFACTURING RESULTS
STEEL CHEMICAL COMPOSITION (UNIT: mass %, BALANCE CONSISTING OF Fe AND IMPURTIES)

| No. | TYPE | C | Si | Mn | sol. Al | P | S | N | B | O | Mg | Ca | Ti | V | Cr | Ni |
|---|---|---|---|---|---|---|---|---|---|---|---|---|---|---|---|---|
| 27 | S9 | 0.002 | 3.0 | 0.2 | 0.5 | 0.01 | 0.001 | 0.002 | — | 0.002 | — | — | 0.001 | — | — | — |
| 28 | S9 | 0.002 | 3.0 | 0.2 | 0.5 | 0.01 | 0.001 | 0.002 | — | 0.002 | — | — | 0.001 | — | — | — |
| 29 | S9 | 0.002 | 3.0 | 0.2 | 0.5 | 0.01 | 0.001 | 0.002 | — | 0.002 | — | — | 0.001 | — | — | — |
| 30 | S9 | 0.002 | 3.0 | 0.2 | 0.5 | 0.01 | 0.001 | 0.002 | — | 0.002 | — | — | 0.001 | — | — | — |
| 31 | S9 | 0.002 | 3.0 | 0.2 | 0.5 | 0.01 | 0.001 | 0.002 | — | 0.002 | — | — | 0.001 | — | — | — |
| 32 | S9 | 0.002 | 3.0 | 0.2 | 0.5 | 0.01 | 0.001 | 0.002 | — | 0.002 | — | — | 0.001 | — | — | — |
| 33 | S9 | 0.002 | 3.0 | 0.2 | 0.5 | 0.01 | 0.001 | 0.002 | — | 0.002 | — | — | 0.001 | — | — | — |
| 34 | S9 | 0.002 | 3.0 | 0.2 | 0.5 | 0.01 | 0.001 | 0.002 | — | 0.002 | — | — | 0.001 | — | — | — |
| 35 | S9 | 0.002 | 3.0 | 0.2 | 0.5 | 0.01 | 0.001 | 0.002 | — | 0.002 | — | — | 0.001 | — | — | — |
| 36 | S10 | 0.002 | 0.9 | 0.2 | 2.3 | 0.01 | 0.001 | 0.002 | — | 0.002 | — | — | 0.001 | — | — | — |
| 37 | S11 | 0.002 | 1.1 | 0.2 | 2.4 | 0.01 | 0.001 | 0.002 | — | 0.002 | — | — | 0.001 | — | — | — |
| 38 | S12 | 0.002 | 3.2 | 0.2 | 0.1 | 0.01 | 0.001 | 0.002 | — | 0.002 | — | — | 0.001 | — | — | — |
| 39 | S13 | 0.002 | 3.3 | 0.2 | 0.1 | 0.01 | 0.001 | 0.002 | — | 0.002 | — | — | 0.001 | — | — | — |
| 40 | S14 | 0.002 | 3.5 | 0.2 | 0.1 | 0.01 | 0.001 | 0.002 | — | 0.002 | — | — | 0.001 | — | — | — |
| 41 | S15 | 0.002 | 3.7 | 0.2 | 0.1 | 0.01 | 0.001 | 0.002 | — | 0.002 | — | — | 0.001 | — | — | — |
| 42 | S16 | 0.002 | 5.1 | 0.2 | 0.5 | 0.01 | 0.001 | 0.002 | — | 0.002 | — | — | 0.001 | — | — | — |
| 43 | S17 | 0.002 | 1.3 | 0.2 | 2.6 | 0.01 | 0.001 | 0.002 | — | 0.002 | — | — | 0.001 | — | — | — |
| 44 | S18 | 0.002 | 1.5 | 0.2 | 2.4 | 0.01 | 0.001 | 0.002 | — | 0.002 | — | — | 0.001 | — | — | — |
| 45 | S19 | 0.006 | 3.0 | 0.2 | 0.5 | 0.01 | 0.001 | 0.002 | — | 0.002 | — | — | 0.001 | — | — | — |
| 46 | S20 | 0.002 | 3.0 | 3.1 | 0.5 | 0.01 | 0.001 | 0.002 | — | 0.002 | — | — | 0.001 | — | — | — |
| 47 | S21 | 0.002 | 3.0 | 0.2 | 0.5 | 0.32 | 0.001 | 0.002 | — | 0.002 | — | — | 0.001 | — | — | — |
| 48 | S22 | 0.002 | 3.0 | 0.2 | 0.5 | 0.01 | 0.015 | 0.002 | — | 0.002 | — | — | 0.001 | — | — | — |
| 49 | S23 | 0.002 | 3.0 | 0.2 | 0.5 | 0.01 | 0.001 | 0.015 | — | 0.002 | — | — | 0.001 | — | — | — |
| 50 | S24 | 0.002 | 3.0 | 0.2 | 0.5 | 0.01 | 0.001 | 0.002 | 0.110 | 0.002 | — | — | 0.001 | — | — | — |
| 51 | S25 | 0.002 | 3.0 | 0.2 | 0.5 | 0.01 | 0.001 | 0.002 | — | 0.002 | 0.150 | — | 0.001 | — | — | — |
| 52 | S26 | 0.002 | 3.0 | 0.2 | 0.5 | 0.01 | 0.001 | 0.002 | — | 0.002 | — | 0.0005 | 0.001 | — | — | — |

TABLE 3

MANUFACTURING RESULTS
STEEL  CHEMICAL COMPOSITION (UNIT: mass %, BALANCE CONSISTING OF Fe AND IMPURITIES)

| No. | TYPE | C | Si | Mn | sol. Al | P | S | N | B | O | Mg | Ca | Ti | V | Cr | Ni |
|---|---|---|---|---|---|---|---|---|---|---|---|---|---|---|---|---|
| 53 | S27 | 0.002 | 3.0 | 0.2 | 0.5 | 0.01 | 0.001 | 0.002 | — | 0.002 | — | 0.001 | 0.001 | — | — | — |
| 54 | S28 | 0.002 | 3.0 | 0.2 | 0.5 | 0.01 | 0.001 | 0.002 | — | 0.002 | — | 0.008 | 0.001 | — | — | — |
| 55 | S29 | 0.002 | 3.0 | 0.2 | 0.5 | 0.01 | 0.001 | 0.002 | — | 0.002 | — | 0.015 | 0.001 | — | — | — |
| 56 | S30 | 0.002 | 3.0 | 0.2 | 0.5 | 0.01 | 0.001 | 0.002 | — | 0.002 | — | — | 0.153 | — | — | — |
| 57 | S31 | 0.002 | 3.0 | 0.2 | 0.5 | 0.01 | 0.001 | 0.002 | — | 0.002 | — | — | 0.001 | 0.123 | — | — |
| 58 | S32 | 0.002 | 3.0 | 0.2 | 0.5 | 0.01 | 0.001 | 0.002 | — | 0.002 | — | — | 0.001 | — | 5.6 | — |
| 59 | S33 | 0.002 | 3.0 | 0.2 | 0.5 | 0.01 | 0.001 | 0.002 | — | 0.002 | — | — | 0.001 | — | — | 5.2 |
| 60 | S34 | 0.002 | 3.0 | 0.2 | 0.5 | 0.01 | 0.001 | 0.002 | — | 0.002 | — | — | 0.001 | — | — | — |
| 61 | S35 | 0.002 | 3.0 | 0.2 | 0.5 | 0.01 | 0.001 | 0.002 | — | 0.002 | — | — | 0.001 | — | — | — |
| 62 | S36 | 0.002 | 3.0 | 0.2 | 0.5 | 0.01 | 0.001 | 0.002 | — | 0.002 | — | — | 0.001 | — | — | — |
| 63 | S37 | 0.002 | 3.0 | 0.2 | 0.5 | 0.01 | 0.001 | 0.002 | — | 0.002 | — | — | 0.001 | — | — | — |
| 64 | S38 | 0.002 | 3.0 | 0.2 | 0.5 | 0.01 | 0.001 | 0.002 | — | 0.002 | — | — | 0.001 | — | — | — |
| 65 | S39 | 0.002 | 3.0 | 0.2 | 0.5 | 0.01 | 0.001 | 0.002 | — | 0.002 | — | — | 0.001 | — | — | — |
| 66 | S40 | 0.002 | 3.0 | 0.2 | 0.5 | 0.01 | 0.001 | 0.002 | — | 0.002 | — | — | 0.001 | — | — | — |
| 67 | S41 | 0.002 | 3.0 | 0.2 | 0.5 | 0.01 | 0.001 | 0.002 | — | 0.002 | — | — | 0.001 | — | — | — |
| 68 | S42 | 0.002 | 3.0 | 0.2 | 0.5 | 0.01 | 0.001 | 0.002 | — | 0.002 | — | — | 0.001 | — | — | — |
| 69 | S43 | 0.002 | 3.0 | 0.2 | 0.5 | 0.01 | 0.001 | 0.002 | — | 0.002 | — | — | 0.001 | — | — | — |
| 70 | S44 | 0.002 | 3.0 | 0.2 | 0.5 | 0.01 | 0.001 | 0.002 | — | 0.002 | — | — | 0.001 | — | — | — |
| 71 | S45 | 0.002 | 3.0 | 0.2 | 0.5 | 0.01 | 0.001 | 0.002 | — | 0.002 | — | — | 0.001 | — | — | — |
| 72 | S46 | 0.002 | 3.0 | 0.2 | 0.5 | 0.01 | 0.001 | 0.002 | — | 0.002 | — | — | 0.001 | — | — | — |
| 73 | S47 | 0.002 | 3.0 | 0.2 | 0.5 | 0.01 | 0.001 | 0.002 | — | 0.002 | — | — | 0.001 | — | — | — |
| 74 | S48 | 0.002 | 3.0 | 0.2 | 0.5 | 0.01 | 0.001 | 0.002 | — | 0.002 | — | — | 0.001 | — | — | — |
| 75 | S49 | 0.002 | 3.0 | 0.2 | 0.5 | 0.01 | 0.001 | 0.002 | — | 0.002 | — | — | 0.001 | — | — | — |
| 76 | S50 | 0.002 | 3.0 | 0.2 | 0.5 | 0.01 | 0.001 | 0.002 | — | 0.002 | — | — | 0.001 | — | — | — |
| 77 | S9 | 0.002 | 3.0 | 0.2 | 0.5 | 0.01 | 0.001 | 0.002 | — | 0.002 | — | — | 0.001 | — | — | — |
| 78 | S9 | 0.002 | 3.0 | 0.2 | 0.5 | 0.01 | 0.001 | 0.002 | — | 0.002 | — | — | 0.001 | — | — | — |

TABLE 4

MANUFACTURING RESULTS
STEEL  CHEMICAL COMPOSITON (UNIT: mass %, BALANCE CONSISTING OF Fe AND IMPURITIES)

| No. | TYPE | C | Si | Mn | sol. Al | P | S | N | B | O | Mg | Ca | Ti | V | Cr | Ni |
|---|---|---|---|---|---|---|---|---|---|---|---|---|---|---|---|---|
| 79 | S9 | 0.002 | 3.0 | 0.2 | 0.5 | 0.01 | 0.001 | 0.002 | — | 0.002 | — | — | 0.001 | — | — | — |
| 80 | S9 | 0.002 | 3.0 | 0.2 | 0.5 | 0.01 | 0.001 | 0.002 | — | 0.002 | — | — | 0.001 | — | — | — |
| 81 | S9 | 0.002 | 3.0 | 0.2 | 0.5 | 0.01 | 0.001 | 0.002 | — | 0.002 | — | — | 0.001 | — | — | — |
| 82 | S9 | 0.002 | 3.0 | 0.2 | 0.5 | 0.01 | 0.001 | 0.002 | — | 0.002 | — | — | 0.001 | — | — | — |
| 83 | S9 | 0.002 | 3.0 | 0.2 | 0.5 | 0.01 | 0.001 | 0.002 | — | 0.002 | — | — | 0.001 | — | — | — |
| 84 | S9 | 0.002 | 3.0 | 0.2 | 0.5 | 0.01 | 0.001 | 0.002 | — | 0.002 | — | — | 0.001 | — | — | — |
| 85 | S9 | 0.002 | 3.0 | 0.2 | 0.5 | 0.01 | 0.001 | 0.002 | — | 0.002 | — | — | 0.001 | — | — | — |
| 86 | S9 | 0.002 | 3.0 | 0.2 | 0.5 | 0.01 | 0.001 | 0.002 | — | 0.002 | — | — | 0.001 | — | — | — |
| 87 | S9 | 0.002 | 3.0 | 0.2 | 0.5 | 0.01 | 0.001 | 0.002 | — | 0.002 | — | — | 0.001 | — | — | — |
| 88 | S9 | 0.002 | 3.0 | 0.2 | 0.5 | 0.01 | 0.001 | 0.002 | — | 0.002 | — | — | 0.001 | — | — | — |
| 89 | S9 | 0.002 | 3.0 | 0.2 | 0.5 | 0.01 | 0.001 | 0.002 | — | 0.002 | — | — | 0.001 | — | — | — |
| 90 | S51 | 0.002 | 3.0 | 0.2 | 0.5 | 0.01 | 0.001 | 0.002 | 0.0030 | 0.002 | — | — | 0.001 | — | — | — |
| 91 | S52 | 0.002 | 3.0 | 0.2 | 0.5 | 0.01 | 0.001 | 0.002 | — | 0.002 | 0.0150 | — | 0.001 | — | — | — |
| 92 | S53 | 0.002 | 3.0 | 0.2 | 0.5 | 0.01 | 0.001 | 0.002 | — | 0.002 | — | — | 0.0025 | — | — | — |
| 93 | S54 | 0.002 | 3.0 | 0.2 | 0.5 | 0.01 | 0.001 | 0.002 | — | 0.002 | — | — | 0.001 | 0.0020 | — | — |
| 94 | S55 | 0.002 | 3.0 | 0.2 | 0.5 | 0.01 | 0.001 | 0.002 | — | 0.002 | — | — | 0.001 | — | 1.5 | — |
| 95 | S56 | 0.002 | 3.0 | 0.2 | 0.5 | 0.01 | 0.001 | 0.002 | — | 0.002 | — | — | 0.001 | — | — | 1.2 |
| 96 | S57 | 0.002 | 3.0 | 0.2 | 0.5 | 0.01 | 0.001 | 0.002 | — | 0.002 | — | — | 0.001 | — | — | — |
| 97 | S58 | 0.002 | 3.0 | 0.2 | 0.5 | 0.01 | 0.001 | 0.002 | — | 0.002 | — | — | 0.001 | — | — | — |
| 98 | S59 | 0.002 | 3.0 | 0.2 | 0.5 | 0.01 | 0.001 | 0.002 | — | 0.002 | — | — | 0.001 | — | — | — |
| 99 | S60 | 0.002 | 3.0 | 0.2 | 0.5 | 0.01 | 0.001 | 0.002 | — | 0.002 | — | — | 0.001 | — | — | — |
| 100 | S61 | 0.002 | 3.0 | 0.2 | 0.5 | 0.01 | 0.001 | 0.002 | — | 0.002 | — | — | 0.001 | — | — | — |
| 101 | S62 | 0.002 | 3.0 | 0.2 | 0.5 | 0.01 | 0.001 | 0.002 | — | 0.002 | — | — | 0.001 | — | — | — |
| 102 | S63 | 0.002 | 3.0 | 0.2 | 0.5 | 0.01 | 0.001 | 0.002 | — | 0.002 | — | — | 0.001 | — | — | — |
| 103 | S64 | 0.002 | 3.0 | 0.2 | 0.5 | 0.01 | 0.001 | 0.002 | — | 0.002 | — | — | 0.001 | — | — | — |
| 104 | S9 | 0.002 | 3.0 | 0.2 | 0.5 | 0.01 | 0.001 | 0.002 | — | 0.002 | — | — | 0.001 | — | — | — |
| 105 | S65 | 0.002 | 3.7 | 0.2 | 0.5 | 0.01 | 0.001 | 0.002 | — | 0.002 | — | — | 0.001 | — | — | — |
| 106 | S66 | 0.002 | 4.2 | 0.2 | 0.3 | 0.01 | 0.002 | 0.002 | — | 0.002 | — | — | 0.001 | — | — | — |

TABLE 5

MANUFACTURING RESULTS

CHEMICAL COMPOSITION (UNIT: mass %, BALANCE CONSISTING OF Fe AND IMPURITIES)

| No. | STEEL TYPE | Cu | Zr | Sn | Sb | Ce | Nd | Bi | W | Mo | Nb | Y | Si + sol. Al | DENSITY g/cm$^3$ | Is T |
|---|---|---|---|---|---|---|---|---|---|---|---|---|---|---|---|
| 1 | S1 | — | — | — | — | — | — | — | — | — | — | — | 4.1 | 7.516 | 1.973 |
| 2 | S1 | — | — | — | — | — | — | — | — | — | — | — | 4.1 | 7.516 | 1.973 |
| 3 | S1 | — | — | — | — | — | — | — | — | — | — | — | 4.1 | 7.516 | 1.973 |
| 4 | S1 | — | — | — | — | — | — | — | — | — | — | — | 4.1 | 7.516 | 1.973 |
| 5 | S1 | — | — | — | — | — | — | — | — | — | — | — | 4.1 | 7.516 | 1.973 |
| 6 | S1 | — | — | — | — | — | — | — | — | — | — | — | 4.1 | 7.516 | 1.973 |
| 7 | S1 | — | — | — | — | — | — | — | — | — | — | — | 4.1 | 7.516 | 1.973 |
| 8 | S1 | — | — | — | — | — | — | — | — | — | — | — | 4.1 | 7.516 | 1.973 |
| 9 | S1 | — | — | — | — | — | — | — | — | — | — | — | 4.1 | 7.516 | 1.973 |
| 10 | S1 | — | — | — | — | — | — | — | — | — | — | — | 4.1 | 7.516 | 1.973 |
| 11 | S2 | — | — | — | — | — | — | — | — | — | — | — | 4.0 | 7.520 | 1.939 |
| 12 | S3 | — | — | — | — | — | — | — | — | — | — | — | 4.0 | 7.570 | 1.989 |
| 13 | S4 | — | — | — | — | — | — | — | — | — | — | — | 3.0 | 7.640 | 2.027 |
| 14 | S5 | — | — | 0.020 | — | — | — | — | — | — | — | — | 4.0 | 7.554 | 1.964 |
| 15 | S6 | — | — | 0.020 | — | — | — | — | — | — | — | — | 4.0 | 7.546 | 1.962 |
| 16 | S7 | — | — | — | 0.030 | — | — | — | — | — | — | — | 4.0 | 7.542 | 1.961 |
| 17 | S8 | — | — | — | 0.030 | — | — | — | — | — | — | — | 4.0 | 7.532 | 1.958 |
| 18 | S2 | — | — | — | — | — | — | — | — | — | — | — | 4.0 | 7.520 | 1.939 |
| 19 | S2 | — | — | — | — | — | — | — | — | — | — | — | 4.0 | 7.520 | 1.939 |
| 20 | S2 | — | — | — | — | — | — | — | — | — | — | — | 4.0 | 7.520 | 1.939 |
| 21 | S9 | — | — | — | — | — | — | — | — | — | — | — | 3.5 | 7.615 | 2.011 |
| 22 | S9 | — | — | — | — | — | — | — | — | — | — | — | 3.5 | 7.615 | 2.011 |
| 23 | S9 | — | — | — | — | — | — | — | — | — | — | — | 3.5 | 7.615 | 2.011 |
| 24 | S9 | — | — | — | — | — | — | — | — | — | — | — | 3.5 | 7.615 | 2.011 |
| 25 | S9 | — | — | — | — | — | — | — | — | — | — | — | 3.5 | 7.615 | 2.011 |
| 26 | S9 | — | — | — | — | — | — | — | — | — | — | — | 3.5 | 7.615 | 2.011 |

TABLE 6

MANUFACTURING RESULTS

CHEMICAL COMPOSITION (UNIT: mass %, BALANCE CONSISTING OF Fe AND IMPURITIES)

| No. | STEEL TYPE | Cu | Zr | Sn | Sb | Ce | Nd | Bi | W | Mo | Nb | Y | Si + sol. Al | DENSITY g/cm$^3$ | Is T |
|---|---|---|---|---|---|---|---|---|---|---|---|---|---|---|---|
| 27 | S9 | — | — | — | — | — | — | — | — | — | — | — | 3.5 | 7.615 | 2.011 |
| 28 | S9 | — | — | — | — | — | — | — | — | — | — | — | 3.5 | 7.615 | 2.011 |
| 29 | S9 | — | — | — | — | — | — | — | — | — | — | — | 3.5 | 7.615 | 2.011 |
| 30 | S9 | — | — | — | — | — | — | — | — | — | — | — | 3.5 | 7.615 | 2.011 |
| 31 | S9 | — | — | — | — | — | — | — | — | — | — | — | 3.5 | 7.615 | 2.011 |
| 32 | S9 | — | — | — | — | — | — | — | — | — | — | — | 3.5 | 7.615 | 2.011 |
| 33 | S9 | — | — | — | — | — | — | — | — | — | — | — | 3.5 | 7.615 | 2.011 |
| 34 | S9 | — | — | — | — | — | — | — | — | — | — | — | 3.5 | 7.615 | 2.011 |
| 35 | S9 | — | — | — | — | — | — | — | — | — | — | — | 3.5 | 7.615 | 2.011 |
| 36 | S10 | — | — | — | — | — | — | — | — | — | — | — | 3.2 | 7.552 | 2.001 |
| 37 | S11 | — | — | — | — | — | — | — | — | — | — | — | 3.5 | 7.528 | 1.989 |
| 38 | S12 | — | — | — | — | — | — | — | — | — | — | — | 3.3 | 7.646 | 2.024 |
| 39 | S13 | — | — | — | — | — | — | — | — | — | — | — | 3.4 | 7.639 | 2.020 |
| 40 | S14 | — | — | — | — | — | — | — | — | — | — | — | 3.6 | 7.626 | 2.012 |
| 41 | S15 | — | — | — | — | — | — | — | — | — | — | — | 3.8 | 7.613 | 2.005 |
| 42 | S16 | — | — | — | — | — | — | — | — | — | — | — | 5.6 | 7.478 | 1.932 |
| 43 | S17 | — | — | — | — | — | — | — | — | — | — | — | 3.9 | 7.493 | 1.971 |
| 44 | S18 | — | — | — | — | — | — | — | — | — | — | — | 3.9 | 7.502 | 1.974 |
| 45 | S19 | — | — | — | — | — | — | — | — | — | — | — | 3.5 | 7.615 | 2.011 |
| 46 | S20 | — | — | — | — | — | — | — | — | — | — | — | 3.5 | 7.615 | 1.951 |
| 47 | S21 | — | — | — | — | — | — | — | — | — | — | — | 3.5 | 7.615 | 2.005 |
| 48 | S22 | — | — | — | — | — | — | — | — | — | — | — | 3.5 | 7.615 | 2.011 |
| 49 | S23 | — | — | — | — | — | — | — | — | — | — | — | 3.5 | 7.615 | 2.011 |
| 50 | S24 | — | — | — | — | — | — | — | — | — | — | — | 3.5 | 7.615 | 2.009 |
| 51 | S25 | — | — | — | — | — | — | — | — | — | — | — | 3.5 | 7.615 | 2.008 |
| 52 | S26 | — | — | — | — | — | — | — | — | — | — | — | 3.5 | 7.615 | 2.011 |

TABLE 7

MANUFACTURING RESULTS

CHEMICAL COMPOSITION (UNIT: mass %, BALANCE CONSISTING OF Fe AND IMPURITIES)

| No. | STEEL TYPE | Cu | Zr | Sn | Sb | Ce | Nd | Bi | W | Mo | Nb | Y | Si + sol. Al | DENSITY g/cm³ | Is T |
|---|---|---|---|---|---|---|---|---|---|---|---|---|---|---|---|
| 53 | S27 | — | — | — | — | — | — | — | — | — | — | — | 3.5 | 7.615 | 2.011 |
| 54 | S28 | — | — | — | — | — | — | — | — | — | — | — | 3.5 | 7.615 | 2.011 |
| 55 | S29 | — | — | — | — | — | — | — | — | — | — | — | 3.5 | 7.615 | 2.011 |
| 56 | S30 | — | — | — | — | — | — | — | — | — | — | — | 3.5 | 7.615 | 2.008 |
| 57 | S31 | — | — | — | — | — | — | — | — | — | — | — | 3.5 | 7.615 | 2.009 |
| 58 | S32 | — | — | — | — | — | — | — | — | — | — | — | 3.5 | 7.615 | 1.894 |
| 59 | S33 | — | — | — | — | — | — | — | — | — | — | — | 3.5 | 7.615 | 1.903 |
| 60 | S34 | 5.3 | — | — | — | — | — | — | — | — | — | — | 3.5 | 7.615 | 1.901 |
| 61 | S35 | — | 0.153 | — | — | — | — | — | — | — | — | — | 3.5 | 7.615 | 2.008 |
| 62 | S36 | — | — | 0.030 | — | — | — | — | — | — | — | — | 3.5 | 7.615 | 2.011 |
| 63 | S37 | — | — | 0.080 | — | — | — | — | — | — | — | — | 3.5 | 7.615 | 2.010 |
| 64 | S38 | — | — | 0.120 | — | — | — | — | — | — | — | — | 3.5 | 7.615 | 2.009 |
| 65 | S39 | — | — | — | 0.030 | — | — | — | — | — | — | — | 3.5 | 7.615 | 2.011 |
| 66 | S40 | — | — | — | 0.080 | — | — | — | — | — | — | — | 3.5 | 7.615 | 2.010 |
| 67 | S41 | — | — | — | 0.120 | — | — | — | — | — | — | — | 3.5 | 7.615 | 2.009 |
| 68 | S42 | — | — | — | — | 0.003 | — | — | — | — | — | — | 3.5 | 7.615 | 2.011 |
| 69 | S43 | — | — | — | — | 0.008 | — | — | — | — | — | — | 3.5 | 7.615 | 2.011 |
| 70 | S44 | — | — | — | — | 0.150 | — | — | — | — | — | — | 3.5 | 7.615 | 2.008 |
| 71 | S45 | — | — | — | — | — | 0.130 | — | — | — | — | — | 3.5 | 7.615 | 2.009 |
| 72 | S46 | — | — | — | — | — | — | 0.142 | — | — | — | — | 3.5 | 7.615 | 2.009 |
| 73 | S47 | — | — | — | — | — | — | — | 0.152 | — | — | — | 3.5 | 7.615 | 2.008 |
| 74 | S48 | — | — | — | — | — | — | — | — | 0.12 | — | — | 3.5 | 7.615 | 2.009 |
| 75 | S49 | — | — | — | — | — | — | — | — | — | 0.159 | — | 3.5 | 7.615 | 2.008 |
| 76 | S50 | — | — | — | — | — | — | — | — | — | — | 0.151 | 3.5 | 7.615 | 2.008 |
| 77 | S9 | — | — | — | — | — | — | — | — | — | — | — | 3.5 | 7.615 | 2.011 |
| 78 | S9 | — | — | — | — | — | — | — | — | — | — | — | 3.5 | 7.615 | 2.011 |

TABLE 8

MANUFACTURING RESULTS

CHEMICAL COMPOSITION (UNIT: mass %, BALANCE CONSISTING OF Fe AND IMPURITIES)

| No. | STEEL TYPE | Cu | Zr | Sn | Sb | Ce | Nd | Bi | W | Mo | Nb | Y | Si + sol. Al | DENSITY g/cm³ | Is T |
|---|---|---|---|---|---|---|---|---|---|---|---|---|---|---|---|
| 79 | S9 | — | — | — | — | — | — | — | — | — | — | — | 3.5 | 7.615 | 2.011 |
| 80 | S9 | — | — | — | — | — | — | — | — | — | — | — | 3.5 | 7.615 | 2.011 |
| 81 | S9 | — | — | — | — | — | — | — | — | — | — | — | 3.5 | 7.615 | 2.011 |
| 82 | S9 | — | — | — | — | — | — | — | — | — | — | — | 3.5 | 7.615 | 2.011 |
| 83 | S9 | — | — | — | — | — | — | — | — | — | — | — | 3.5 | 7.615 | 2.011 |
| 84 | S9 | — | — | — | — | — | — | — | — | — | — | — | 3.5 | 7.615 | 2.011 |
| 85 | S9 | — | — | — | — | — | — | — | — | — | — | — | 3.5 | 7.615 | 2.011 |
| 86 | S9 | — | — | — | — | — | — | — | — | — | — | — | 3.5 | 7.615 | 2.011 |
| 87 | S9 | — | — | — | — | — | — | — | — | — | — | — | 3.5 | 7.615 | 2.011 |
| 88 | S9 | — | — | — | — | — | — | — | — | — | — | — | 3.5 | 7.615 | 2.011 |
| 89 | S9 | — | — | — | — | — | — | — | — | — | — | — | 3.5 | 7.615 | 2.011 |
| 90 | S51 | — | — | — | — | — | — | — | — | — | — | — | 3.5 | 7.615 | 2.011 |
| 91 | S52 | — | — | — | — | — | — | — | — | — | — | — | 3.5 | 7.615 | 2.011 |
| 92 | S53 | — | — | — | — | — | — | — | — | — | — | — | 3.5 | 7.615 | 2.011 |
| 93 | S54 | — | — | — | — | — | — | — | — | — | — | — | 3.5 | 7.615 | 2.011 |
| 94 | S55 | — | — | — | — | — | — | — | — | — | — | — | 3.5 | 7.615 | 1.980 |
| 95 | S56 | — | — | — | — | — | — | — | — | — | — | — | 3.5 | 7.615 | 1.986 |
| 96 | S57 | 1.8 | — | — | — | — | — | — | — | — | — | — | 3.5 | 7.615 | 1.974 |
| 97 | S58 | — | 0.0081 | — | — | — | — | — | — | — | — | — | 3.5 | 7.615 | 2.011 |
| 98 | S59 | — | — | — | — | — | 0.080 | — | — | — | — | — | 3.5 | 7.615 | 2.010 |
| 99 | S60 | — | — | — | — | — | — | 0.003 | — | — | — | — | 3.5 | 7.615 | 2.011 |
| 100 | S61 | — | — | — | — | — | — | — | 0.009 | — | — | — | 3.5 | 7.615 | 2.011 |
| 101 | S62 | — | — | — | — | — | — | — | — | 0.009 | — | — | 3.5 | 7.615 | 2.011 |
| 102 | S63 | — | — | — | — | — | — | — | — | — | 0.0020 | — | 3.5 | 7.615 | 2.011 |
| 103 | S64 | — | — | — | — | — | — | — | — | — | — | 0.040 | 3.5 | 7.615 | 2.011 |
| 104 | S9 | — | — | — | — | — | — | — | — | — | — | — | 3.5 | 7.615 | 2.011 |
| 105 | S65 | — | — | — | — | — | — | — | — | — | — | — | 4.2 | 7.569 | 1.985 |
| 106 | S66 | — | — | — | — | — | — | — | — | — | — | — | 4.5 | 7.559 | 1.976 |

TABLE 9

| | | Manufacturing Conditions | | | Cold Rolling | | | | | Final Annealing | | | Stress Relief Annealing | |
|---|---|---|---|---|---|---|---|---|---|---|---|---|---|---|
| | | Sheet Thickness of Hot Rolled Steel Sheet | Hot Band Annealing Retention Temperature | Hot Band Annealing Retention Time | Cumulative Rolling Reduction | Final Sheet Thickness | Intermediate Annealing Retention Temperature | Cold Rolling Intermediate Annealing Retention Time | Rolling Reduction After Intermediate Annealing | Average Heating Rate From Room Temperature To 650° C. | Average Heating Rate From 650° C. To Final Annealing | Final Annealing Temperature | Temperature | Time |
| No. | Steel Type | mm | ° C. | min. | % | mm | ° C. | min. | % | ° C./sec | ° C./sec | ° C. | ° C. | hour |
| 1 | S1 | 2.20 | 900 | 600 | 86.4 | 0.30 | 800 | 600 | 80 | 15 | 15 | 1050 | — | — |
| 2 | S1 | 2.30 | — | — | 91.3 | 0.20 | 800 | 600 | 75 | 15 | 15 | 1180 | — | — |
| 3 | S1 | 2.30 | — | — | 91.3 | 0.20 | 800 | 600 | 67 | 15 | 15 | 1080 | — | — |
| 4 | S1 | 2.20 | — | — | 88.6 | 0.25 | 750 | 1800 | 64 | 15 | 15 | 950 | — | — |
| 5 | S1 | 2.20 | — | — | 86.4 | 0.30 | 900 | 600 | 65 | 15 | 15 | 1050 | — | — |
| 6 | S1 | 2.30 | — | — | 82.6 | 0.40 | 800 | 600 | 60 | 15 | 15 | 1000 | — | — |
| 7 | S1 | 2.20 | 900 | 600 | 86.4 | 0.30 | — | — | — | 15 | 15 | 1050 | — | — |
| 8 | S1 | 2.19 | — | — | 77.1 | 0.50 | 800 | 600 | 47 | 15 | 15 | 950 | — | — |
| 9 | S1 | 2.16 | — | — | 81.5 | 0.40 | 800 | 600 | 47 | 15 | 15 | 1140 | — | — |
| 10 | S1 | 2.30 | — | — | 91.3 | 0.20 | 800 | 600 | 60 | 15 | 15 | 1000 | — | — |
| 11 | S2 | 2.00 | — | — | 87.5 | 0.25 | 750 | 600 | 72 | 15 | 15 | 1050 | — | — |
| 12 | S3 | 2.00 | — | — | 85.0 | 0.30 | 800 | 600 | 65 | 15 | 15 | 1100 | — | — |
| 13 | S4 | 2.00 | — | — | 85.0 | 0.30 | 800 | 600 | 67 | 15 | 15 | 1140 | — | — |
| 14 | S5 | 2.00 | — | — | 85.0 | 0.30 | 800 | 240 | 81 | 15 | 15 | 1100 | — | — |
| 15 | S6 | 2.00 | — | — | 85.0 | 0.30 | 800 | 240 | 81 | 15 | 15 | 1100 | — | — |
| 16 | S7 | 2.00 | — | — | 85.0 | 0.30 | 800 | 240 | 81 | 15 | 15 | 1100 | — | — |
| 17 | S8 | 2.00 | — | — | 85.0 | 0.30 | 800 | 240 | 81 | 15 | 15 | 1100 | — | — |
| 18 | S2 | 2.00 | — | — | 87.5 | 0.25 | 800 | 600 | 72 | 15 | 15 | 1100 | — | — |
| 19 | S2 | 2.00 | 800 | 600 | 87.5 | 0.25 | 800 | 600 | 72 | 15 | 15 | 1100 | — | — |
| 20 | S2 | 2.00 | 950 | 0.3360 | 87.5 | 0.25 | 800 | 600 | 72 | 15 | 15 | 1100 | — | — |
| 21 | S9 | 2.00 | 1000 | 10 | 87.5 | 0.25 | — | — | — | 15 | 50 | 750 | 800 | 2 |
| 22 | S9 | 2.00 | 1000 | 1 | 87.5 | 0.25 | — | — | — | 15 | 50 | 750 | 800 | 2 |
| 23 | S9 | 2.00 | 950 | 2 | 87.5 | 0.25 | — | — | — | 15 | 50 | 750 | 800 | 2 |
| 24 | S9 | 2.00 | 900 | 1 | 87.5 | 0.25 | — | — | — | 15 | 50 | 750 | 800 | 2 |
| 25 | S9 | 3.00 | 1000 | 1 | 91.7 | 0.25 | 950 | 1 | 83 | 15 | 50 | 750 | 800 | 2 |
| 26 | S9 | 3.00 | 1000 | 1 | 91.7 | 0.25 | 1000 | 1 | 80 | 15 | 50 | 750 | 800 | 2 |

TABLE 10

| | | MANUFACTURING CONDITIONS | | | | | |
|---|---|---|---|---|---|---|---|
| | | | HOT BAND ANNEALING | | COLD ROLLING | | |
| | | SHEET THICKNESS | | | CUMULATIVE | FINAL | INTERMEDIATE ANNEALING |
| No. | STEEL TYPE | OF HOT ROLLED STEEL SHEET mm | RETENTION TEMPERATURE °C. | RETENTION TIME min. | ROLLING REDUCTION % | SHEET THICKNESS mm | RETENTION TEMPERATURE °C. |
| 27 | S9 | 3.00 | 800 | 1 | 91.7 | 0.25 | 1000 |
| 28 | S9 | 3.00 | 1000 | 1 | 91.7 | 0.25 | 1000 |
| 29 | S9 | 3.00 | 950 | 1 | 91.7 | 0.25 | 950 |
| 30 | S9 | 3.00 | 1000 | 1 | 91.7 | 0.25 | 1000 |
| 31 | S9 | 3.00 | 950 | 1 | 91.7 | 0.25 | 950 |
| 32 | S9 | 3.00 | 1000 | 1 | 91.7 | 0.25 | 1000 |
| 33 | S9 | 3.00 | 1000 | 1 | 91.7 | 0.25 | 950 |
| 34 | S9 | 3.00 | 1000 | 1 | 91.7 | 0.25 | 1000 |
| 35 | S9 | 3.00 | 1000 | 1 | 91.7 | 0.25 | 1000 |
| 36 | S10 | 2.00 | 1000 | 1 | 87.5 | 0.25 | — |
| 37 | S11 | 2.00 | 1000 | 1 | 87.5 | 0.25 | — |
| 38 | S12 | 2.00 | 1000 | 1 | 87.5 | 0.25 | — |
| 39 | S13 | 2.00 | 1000 | 1 | 87.5 | 0.25 | — |
| 40 | S14 | 2.00 | 1000 | 1 | 87.5 | 0.25 | — |
| 41 | S15 | 2.00 | 1000 | 1 | 87.5 | 0.25 | — |
| 42 | S16 | 2.00 | 1000 | 1 | FRACTURE | — | — |
| 43 | S17 | 2.00 | 1000 | 1 | FRACTURE | — | — |
| 44 | S18 | 2.00 | 1000 | 1 | 87.5 | 0.25 | — |
| 45 | S19 | 2.00 | 1000 | 1 | 87.5 | 0.25 | — |
| 46 | S20 | 2.00 | 1000 | 1 | FRACTURE | — | — |
| 47 | S21 | 2.00 | 1000 | 1 | FRACTURE | — | — |
| 48 | S22 | 2.00 | 1000 | 1 | 87.5 | 0.25 | — |
| 49 | S23 | 2.00 | 1000 | 1 | 87.5 | 0.25 | — |
| 50 | S24 | 2.00 | 1000 | 1 | 87.5 | 0.25 | — |
| 51 | S25 | 2.00 | 1000 | 1 | 87.5 | 0.25 | — |
| 52 | S26 | 2.00 | 1000 | 1 | 87.5 | 0.25 | — |

| | MANUFACTURING CONDITIONS | | | | | |
|---|---|---|---|---|---|---|
| | COLD ROLLING INTERMEDIATE ANNEALING | | FINAL ANNEALING | | | |
| | | | AVERAGE HEATING RATE FROM ROOM TEMPERATURE | AVERAGE HEATING RATE FROM 650° C. TO FINAL ANNEALING | FINAL ANNEALING | STRESS RELIEF ANNEALING |
| | RETENTION | ROLLING REDUCTION AFTER INTERMEDIATE | | | | |
| No. | TIME min. | ANNEALING % | TO 650° C. °C./sec | TEMPERATURE °C./sec | TEMPERATURE °C. | TEMPERATURE °C. / TIME hour |
| 27 | 1 | 75 | 15 | 50 | 750 | 800 / 2 |
| 28 | 1 | 71 | 15 | 50 | 750 | 800 / 2 |
| 29 | 1 | 71 | 15 | 50 | 750 | 800 / 2 |
| 30 | 1 | 67 | 15 | 50 | 750 | 800 / 2 |
| 31 | 1 | 67 | 15 | 50 | 750 | 800 / 2 |
| 32 | 1 | 60 | 15 | 50 | 750 | 800 / 2 |
| 33 | 1 | 60 | 15 | 50 | 750 | 800 / 2 |
| 34 | 2 | 60 | 15 | 50 | 750 | 800 / 2 |
| 35 | 5 | 60 | 15 | 50 | 750 | 800 / 2 |
| 36 | — | — | 15 | 50 | 750 | 800 / 2 |
| 37 | — | — | 15 | 50 | 750 | 800 / 2 |
| 38 | — | — | 15 | 50 | 750 | 800 / 2 |
| 39 | — | — | 15 | 50 | 750 | 800 / 2 |
| 40 | — | — | 15 | 50 | 750 | 800 / 2 |
| 41 | — | — | 15 | 50 | 750 | 800 / 2 |
| 42 | — | — | — | — | — | — / — |
| 43 | — | — | — | — | — | — / — |
| 44 | — | — | 15 | 50 | 750 | 800 / 2 |
| 45 | — | — | 15 | 50 | 750 | 800 / 2 |
| 46 | — | — | — | — | — | — / — |
| 47 | — | — | — | — | — | — / — |
| 48 | — | — | 15 | 50 | 750 | 800 / 2 |
| 49 | — | — | 15 | 50 | 750 | 800 / 2 |
| 50 | — | — | 15 | 50 | 750 | 800 / 2 |
| 51 | — | — | 15 | 50 | 750 | 800 / 2 |
| 52 | — | — | 15 | 50 | 750 | 800 / 2 |

TABLE 11

| | | MANUFACTURING CONDITIONS | | | | | |
|---|---|---|---|---|---|---|---|
| | | | HOT BAND ANNEALING | | COLD ROLLING | | |
| | | SHEET THICKNESS | | | CUMULATIVE | FINAL | INTERMEDIATE ANNEALING |
| No. | STEEL TYPE | OF HOT ROLLED STEEL SHEET mm | RETENTION TEMPERATURE °C. | RETENTION TIME min. | ROLLING REDUCTION % | SHEET THICKNESS mm | RETENTION TEMPERATURE °C. |
| 53 | S27 | 2.00 | 1000 | 1 | 87.5 | 0.25 | — |
| 54 | S28 | 2.00 | 1000 | 1 | 87.5 | 0.25 | — |
| 55 | S29 | 2.00 | 1000 | 1 | 87.5 | 0.25 | — |
| 56 | S30 | 2.00 | 1000 | 1 | 87.5 | 0.25 | — |
| 57 | S31 | 2.00 | 1000 | 1 | 87.5 | 0.25 | — |
| 58 | S32 | 2.00 | 1000 | 1 | 87.5 | 0.25 | — |
| 59 | S33 | 2.00 | 1000 | 1 | 87.5 | 0.25 | — |
| 60 | S34 | 2.00 | 1000 | 1 | 87.5 | 0.25 | — |
| 61 | S35 | 2.00 | 1000 | 1 | 87.5 | 0.25 | — |
| 62 | S36 | 2.00 | 1000 | 1 | 87.5 | 0.25 | — |
| 63 | S37 | 2.00 | 1000 | 1 | 87.5 | 0.25 | — |
| 64 | S38 | 2.00 | 1000 | 1 | FRACTURE | — | — |
| 65 | S39 | 2.00 | 1000 | 1 | 87.5 | 0.25 | — |
| 66 | S40 | 2.00 | 1000 | 1 | 87.5 | 0.25 | — |
| 67 | S41 | 2.00 | 1000 | 1 | FRACTURE | — | — |
| 68 | S42 | 2.00 | 1000 | 1 | 87.5 | 0.25 | — |
| 69 | S43 | 2.00 | 1000 | 1 | 87.5 | 0.25 | — |
| 70 | S44 | 2.00 | 1000 | 1 | 87.5 | 0.25 | — |
| 71 | S45 | 2.00 | 1000 | 1 | 87.5 | 0.25 | — |
| 72 | S46 | 2.00 | 1000 | 1 | 87.5 | 0.25 | — |
| 73 | S47 | 2.00 | 1000 | 1 | 87.5 | 0.25 | — |
| 74 | S48 | 2.00 | 1000 | 1 | 87.5 | 0.25 | — |
| 75 | S49 | 2.00 | 1000 | 1 | 87.5 | 0.25 | — |
| 76 | S50 | 2.00 | 1000 | 1 | 87.5 | 0.25 | — |
| 77 | S9 | 2.00 | 1000 | 1 | 92.5 | 0.15 | — |
| 78 | S9 | 2.00 | 1000 | 1 | 90.0 | 0.20 | — |

| | MANUFACTURING CONDITIONS | | | | | |
|---|---|---|---|---|---|---|
| | COLD ROLLING INTERMEDIATE ANNEALING | | FINAL ANNEALING | | | | |
| | | | AVERAGE HEATING RATE FROM ROOM TEMPERATURE | AVERAGE HEATING RATE FROM 650° C. TO FINAL ANNEALING | FINAL ANNEALING | STRESS RELIEF ANNEALING | |
| No. | RETENTION TIME min. | ROLLING REDUCTION AFTER INTERMEDIATE ANNEALING % | TO 650° C. °C./sec | TEMPERATURE °C./sec | TEMPERATURE °C. | TEMPERATURE °C. | TIME hour |
| 53 | — | — | 15 | 50 | 750 | 800 | 2 |
| 54 | — | — | 15 | 50 | 750 | 800 | 2 |
| 55 | — | — | 15 | 50 | 750 | 800 | 2 |
| 56 | — | — | 15 | 50 | 750 | 800 | 2 |
| 57 | — | — | 15 | 50 | 750 | 800 | 2 |
| 58 | — | — | 15 | 50 | 750 | 800 | 2 |
| 59 | — | — | 15 | 50 | 750 | 800 | 2 |
| 60 | — | — | 15 | 50 | 750 | 800 | 2 |
| 61 | — | — | 15 | 50 | 750 | 800 | 2 |
| 62 | — | — | 15 | 50 | 750 | 800 | 2 |
| 63 | — | — | 15 | 50 | 750 | 800 | 2 |
| 64 | — | — | — | — | — | — | — |
| 65 | — | — | 15 | 50 | 750 | 800 | 2 |
| 66 | — | — | 15 | 50 | 750 | 800 | 2 |
| 67 | — | — | — | — | — | — | — |
| 68 | — | — | 15 | 50 | 750 | 800 | 2 |
| 69 | — | — | 15 | 50 | 750 | 800 | 2 |
| 70 | — | — | 15 | 50 | 750 | 800 | 2 |
| 71 | — | — | 15 | 50 | 750 | 800 | 2 |
| 72 | — | — | 15 | 50 | 750 | 800 | 2 |
| 73 | — | — | 15 | 50 | 750 | 800 | 2 |
| 74 | — | — | 15 | 50 | 750 | 800 | 2 |
| 75 | — | — | 15 | 50 | 750 | 800 | 2 |
| 76 | — | — | 15 | 50 | 750 | 800 | 2 |
| 77 | — | — | 15 | 50 | 750 | 800 | 2 |
| 78 | — | — | 15 | 50 | 750 | 800 | 2 |

TABLE 12

| | | MANUFACTURING CONDITIONS | | | | | |
|---|---|---|---|---|---|---|---|
| | | | | COLD ROLLING | | | |
| | | SHEET THICKNESS | HOT BAND ANNEALING | | CUMULATIVE | FINAL | INTERMEDIATE ANNEALING |
| No. | STEEL TYPE | OF HOT ROLLED STEEL SHEET mm | RETENTION TEMPERATURE ° C. | RETENTION TIME min. | ROLLING REDUCTION % | SHEET THICKNESS mm | RETENTION TEMPERATURE ° C. |
| 79 | S9 | 2.00 | 1000 | 1 | 85.0 | 0.30 | — |
| 80 | S9 | 2.00 | 1000 | 1 | 82.5 | 0.35 | — |
| 81 | S9 | 2.00 | 1000 | 1 | 80.0 | 0.40 | — |
| 82 | S9 | 2.00 | 1000 | 1 | 87.5 | 0.25 | — |
| 83 | S9 | 2.00 | 1000 | 1 | 87.5 | 0.25 | — |
| 84 | S9 | 2.00 | 1000 | 1 | 87.5 | 0.25 | — |
| 85 | S9 | 2.00 | 1000 | 1 | 87.5 | 0.25 | — |
| 86 | S9 | 2.00 | 1000 | 1 | 87.5 | 0.25 | — |
| 87 | S9 | 2.00 | 1000 | 1 | 87.5 | 0.25 | — |
| 88 | S9 | 2.00 | 1000 | 1 | 87.5 | 0.25 | — |
| 89 | S9 | 2.00 | 1000 | 1 | 87.5 | 0.25 | — |
| 90 | S51 | 2.00 | 1000 | 1 | 87.5 | 0.25 | — |
| 91 | S52 | 2.00 | 1000 | 1 | 87.5 | 0.25 | — |
| 92 | S53 | 2.00 | 1000 | 1 | 87.5 | 0.25 | — |
| 93 | S54 | 2.00 | 1000 | 1 | 87.5 | 0.25 | — |
| 94 | S55 | 2.00 | 1000 | 1 | 87.5 | 0.25 | — |
| 95 | S56 | 2.00 | 1000 | 1 | 87.5 | 0.25 | — |
| 96 | S57 | 2.00 | 1000 | 1 | 87.5 | 0.25 | — |
| 97 | S58 | 2.00 | 1000 | 1 | 87.5 | 0.25 | — |
| 98 | S59 | 2.00 | 1000 | 1 | 87.5 | 0.25 | — |
| 99 | S60 | 2.00 | 1000 | 1 | 87.5 | 0.25 | — |
| 100 | S61 | 2.00 | 1000 | 1 | 87.5 | 0.25 | — |
| 101 | S62 | 2.00 | 1000 | 1 | 87.5 | 0.25 | — |
| 102 | S63 | 2.00 | 1000 | 1 | 87.5 | 0.25 | — |
| 103 | S64 | 2.00 | 1000 | 1 | 87.5 | 0.25 | — |
| 104 | S9 | 2.00 | 1000 | 1 | 87.5 | 0.25 | — |
| 105 | S65 | 2.00 | 1000 | 1 | 87.5 | 0.25 | — |
| 106 | S66 | 2.00 | 950 | 2 | 87.5 | 0.25 | — |

| | MANUFACTURING CONDITIONS | | | | | | |
|---|---|---|---|---|---|---|---|
| | COLD ROLLING INTERMEDIATE ANNEALING | | FINAL ANNEALING | | | | |
| | | | AVERAGE | AVERAGE HEATING | | | |
| | | ROLLING REDUCTION AFTER INTERMEDIATE ANNEALING % | HEATING RATE FROM ROOM TEMPERATURE TO 650° C. ° C./sec | RATE FROM 650° C. TO FINAL ANNEALING ° C./sec | FINAL ANNEALING TEMPERATURE ° C. | STRESS RELIEF ANNEALING | |
| No. | RETENTION TIME min. | | | | | TEMPERATURE ° C. | TIME hour |
| 79 | — | — | 15 | 50 | 750 | 800 | 2 |
| 80 | — | — | 15 | 50 | 750 | 800 | 2 |
| 81 | — | — | 15 | 50 | 750 | 800 | 2 |
| 82 | — | — | 15 | 50 | 750 | — | — |
| 83 | — | — | 15 | 50 | 750 | 750 | 2 |
| 84 | — | — | 15 | 50 | 750 | 850 | 2 |
| 85 | — | — | 15 | 50 | 750 | 850 | 5 |
| 86 | — | — | 4 | 50 | 750 | 800 | 2 |
| 87 | — | — | 25 | 25 | 750 | 800 | 2 |
| 88 | — | — | 15 | 15 | 750 | 800 | 2 |
| 89 | — | — | 15 | 110 | 750 | 800 | 2 |
| 90 | — | — | 15 | 50 | 750 | 800 | 2 |
| 91 | — | — | 18 | 25 | 750 | 800 | 2 |
| 92 | — | — | 18 | 25 | 750 | 800 | 2 |
| 93 | — | — | 15 | 50 | 750 | 800 | 2 |
| 94 | — | — | 15 | 50 | 750 | 800 | 2 |
| 95 | — | — | 15 | 50 | 750 | 800 | 2 |
| 96 | — | — | 15 | 50 | 750 | 800 | 2 |
| 97 | — | — | 15 | 50 | 750 | 800 | 2 |
| 98 | — | — | 15 | 50 | 750 | 800 | 2 |
| 99 | — | — | 15 | 50 | 750 | 800 | 2 |
| 100 | — | — | 15 | 50 | 750 | 800 | 2 |
| 101 | — | — | 15 | 50 | 750 | 800 | 2 |
| 102 | — | — | 15 | 50 | 750 | 800 | 2 |
| 103 | — | — | 15 | 50 | 750 | 800 | 2 |

TABLE 12-continued

| | | | | | | | |
|---|---|---|---|---|---|---|---|
| 104 | — | — | 15 | 50 | 800 | 800 | 2 |
| 105 | — | — | 15 | 50 | 750 | 800 | 2 |
| 106 | — | — | 15 | 50 | 750 | 800 | 2 |

CC

TABLE 13

| | | | | MANUFACTURING RESULTS | | | | |
|---|---|---|---|---|---|---|---|---|
| | | | | | $B_{50}$ | | YOUNG'S MODULUS | |
| No. | STEEL TYPE | AVERAGE GRAIN SIZE μm | $W_{10/1k}$ W/kg | L DIRECTION T | DIRECTION MAKING ANGLE OF 45° WITH L DIRECTION T | C DIRECTION T | L DIRECTION GPa | DIRECTION MAKING ANGLE OF 45° WITH L DIRECTION GPa |
| 1 | S1 | 78 | 65 | 1.709 | 1.561 | 1.621 | 165 | 203 |
| 2 | S1 | 162 | 47 | 1.720 | 1.554 | 1.609 | 164 | 204 |
| 3 | S1 | 90 | 42 | 1.708 | 1.553 | 1.593 | 169 | 201 |
| 4 | S1 | 51 | 56 | 1.707 | 1.551 | 1.590 | 169 | 200 |
| 5 | S1 | 80 | 67 | 1.736 | 1.533 | 1.610 | 159 | 207 |
| 6 | S1 | 65 | 89 | 1.705 | 1.554 | 1.598 | 169 | 201 |
| 7 | S1 | 73 | 70 | 1.681 | 1.581 | 1.632 | 171 | 199 |
| 8 | S1 | 55 | 110 | 1.684 | 1.587 | 1.592 | 176 | 196 |
| 9 | S1 | 120 | 91 | 1.701 | 1.562 | 1.596 | 170 | 200 |
| 10 | S1 | 70 | 44 | 1.689 | 1.551 | 1.580 | 176 | 196 |
| 11 | S2 | 82 | 51 | 1.681 | 1.528 | 1.579 | 166 | 202 |
| 12 | S3 | 98 | 62 | 1.721 | 1.566 | 1.607 | 169 | 201 |
| 13 | S4 | 115 | 69 | 1.753 | 1.600 | 1.643 | 168 | 201 |
| 14 | S5 | 95 | 60 | 1.705 | 1.551 | 1.624 | 162 | 205 |
| 15 | S6 | 107 | 63 | 1.686 | 1.551 | 1.618 | 168 | 201 |
| 16 | S7 | 111 | 61 | 1.691 | 1.553 | 1.623 | 165 | 203 |
| 17 | S8 | 90 | 62 | 1.679 | 1.553 | 1.616 | 168 | 201 |
| 18 | S2 | 101 | 50 | 1.692 | 1.528 | 1.582 | 163 | 204 |
| 19 | S2 | 96 | 48 | 1.709 | 1.500 | 1.599 | 156 | 209 |
| 20 | S2 | 89 | 49 | 1.704 | 1.507 | 1.593 | 158 | 207 |
| 21 | S9 | 81 | 50 | 1.685 | 1.616 | 1.675 | 175 | 193 |
| 22 | S9 | 80 | 51 | 1.685 | 1.612 | 1.665 | 171 | 195 |
| 23 | S9 | 83 | 49 | 1.680 | 1.606 | 1.660 | 180 | 193 |
| 24 | S9 | 82 | 50 | 1.710 | 1.623 | 1.665 | 182 | 191 |
| 25 | S9 | 84 | 49 | 1.713 | 1.603 | 1.674 | 158 | 193 |
| 26 | S9 | 86 | 49 | 1.715 | 1.598 | 1.672 | 160 | 195 |

| | | MANUFACTURING RESULTS | | | | | |
|---|---|---|---|---|---|---|---|
| No. | YOUNG'S MODULUS C DIRECTION GPa | X1 VALUE | X2 VALUE | E1 VALUE | E2 VALUE | ROUNDNESS % | NOTE |
| 1 | 186 | 0.851 | 1.067 | 0.886 | 0.863 | 0.021 | COMPARATIVE EXAMPLE |
| 2 | 186 | 0.853 | 1.071 | 0.881 | 0.856 | 0.021 | COMPARATIVE EXAMPLE |
| 3 | 187 | 0.846 | 1.063 | 0.902 | 0.887 | 0.021 | COMPARATIVE EXAMPLE |
| 4 | 187 | 0.845 | 1.063 | 0.905 | 0.891 | 0.021 | COMPARATIVE EXAMPLE |
| 5 | 184 | 0.859 | 1.091 | 0.864 | 0.831 | 0.021 | COMPARATIVE EXAMPLE |
| 6 | 187 | 0.846 | 1.063 | 0.903 | 0.888 | 0.021 | COMPARATIVE EXAMPLE |
| 7 | 188 | 0.844 | 1.048 | 0.911 | 0.899 | 0.021 | COMPARATIVE EXAMPLE |
| 8 | 189 | 0.838 | 1.032 | 0.929 | 0.927 | 0.021 | COMPARATIVE EXAMPLE |
| 9 | 187 | 0.844 | 1.055 | 0.908 | 0.896 | 0.021 | COMPARATIVE EXAMPLE |
| 10 | 190 | 0.838 | 1.054 | 0.926 | 0.932 | 0.021 | COMPARATIVE EXAMPLE |
| 11 | 186 | 0.849 | 1.067 | 0.892 | 0.872 | 0.021 | COMPARATIVE EXAMPLE |
| 12 | 187 | 0.846 | 1.063 | 0.903 | 0.888 | 0.021 | COMPARATIVE EXAMPLE |
| 13 | 187 | 0.847 | 1.061 | 0.901 | 0.885 | 0.021 | COMPARATIVE EXAMPLE |
| 14 | 185 | 0.854 | 1.073 | 0.877 | 0.849 | 0.021 | COMPARATIVE EXAMPLE |
| 15 | 187 | 0.848 | 1.065 | 0.897 | 0.879 | 0.021 | COMPARATIVE EXAMPLE |
| 16 | 186 | 0.851 | 1.067 | 0.888 | 0.865 | 0.021 | COMPARATIVE EXAMPLE |
| 17 | 187 | 0.847 | 1.061 | 0.901 | 0.884 | 0.021 | COMPARATIVE EXAMPLE |
| 18 | 185 | 0.854 | 1.071 | 0.879 | 0.852 | 0.021 | COMPARATIVE EXAMPLE |
| 19 | 184 | 0.862 | 1.103 | 0.852 | 0.814 | 0.022 | COMPARATIVE EXAMPLE |
| 20 | 184 | 0.860 | 1.094 | 0.861 | 0.826 | 0.022 | COMPARATIVE EXAMPLE |
| 21 | 185 | 0.836 | 1.040 | 0.946 | 0.933 | 0.020 | INVENTIVE EXAMPLE |
| 22 | 181 | 0.834 | 1.039 | 0.945 | 0.903 | 0.020 | INVENTIVE EXAMPLE |
| 23 | 189 | 0.832 | 1.040 | 0.952 | 0.956 | 0.020 | INVENTIVE EXAMPLE |
| 24 | 195 | 0.843 | 1.040 | 0.933 | 0.987 | 0.020 | INVENTIVE EXAMPLE |

TABLE 13-continued

| | | | | | | | |
|---|---|---|---|---|---|---|---|
| 25 | 178 | 0.845 | 1.056 | 0.888 | 0.870 | 0.021 | COMPARATIVE EXAMPLE |
| 26 | 182 | 0.845 | 1.060 | 0.879 | 0.877 | 0.021 | COMPARATIVE EXAMPLE |

TABLE 14

| | | | MANUFACTURING RESULTS | | | | |
|---|---|---|---|---|---|---|---|
| | | | | $B_{50}$ | | YOUNG'S MODULUS | |
| No. | STEEL TYPE | AVERAGE GRAIN SIZE μm | $W_{10/1k}$ W/kg | L DIRECTION T | DIRECTION MAKING ANGLE OF 45° WITH L DIRECTION T | C DIRECTION T | L DIRECTION GPa | DIRECTION MAKING ANGLE OF 45° WITH L DIRECTION GPa |
| 27 | S9 | 85 | 50 | 1.716 | 1.590 | 1.670 | 155 | 197 |
| 28 | S9 | 87 | 48 | 1.718 | 1.592 | 1.668 | 156 | 202 |
| 29 | S9 | 85 | 49 | 1.720 | 1.588 | 1.670 | 180 | 243 |
| 30 | S9 | 88 | 48 | 1.730 | 1.583 | 1.680 | 175 | 240 |
| 31 | S9 | 86 | 50 | 1.740 | 1.575 | 1.680 | 165 | 229 |
| 32 | S9 | 88 | 48 | 1.745 | 1.573 | 1.675 | 180 | 261 |
| 33 | S9 | 89 | 47 | 1.750 | 1.574 | 1.670 | 168 | 180 |
| 34 | S9 | 88 | 48 | 1.755 | 1.573 | 1.665 | 171 | 182 |
| 35 | S9 | 90 | 47 | 1.760 | 1.574 | 1.660 | 180 | 189 |
| 36 | S10 | 80 | 89 | 1.675 | 1.602 | 1.655 | 171 | 194 |
| 37 | S11 | 80 | 77 | 1.663 | 1.591 | 1.643 | 172 | 196 |
| 38 | S12 | 80 | 66 | 1.697 | 1.623 | 1.677 | 170 | 194 |
| 39 | S13 | 80 | 61 | 1.693 | 1.620 | 1.673 | 170 | 194 |
| 40 | S14 | 80 | 53 | 1.686 | 1.613 | 1.666 | 170 | 194 |
| 41 | S15 | 80 | 46 | 1.679 | 1.606 | 1.659 | 170 | 194 |
| 42 | S16 | — | — | — | — | — | — | — |
| 43 | S17 | — | — | — | — | — | — | — |
| 44 | S18 | 80 | 47 | 1.649 | 1.578 | 1.630 | 172 | 194 |
| 45 | S19 | 60 | 95 | 1.687 | 1.613 | 1.666 | 169 | 193 |
| 46 | S20 | — | — | — | — | — | — | — |
| 47 | S21 | — | — | — | — | — | — | — |
| 48 | S22 | 53 | 98 | 1.684 | 1.612 | 1.664 | 172 | 194 |
| 49 | S23 | 57 | 97 | 1.686 | 1.613 | 1.666 | 171 | 193 |
| 50 | S24 | 65 | 95 | 1.682 | 1.611 | 1.663 | 172 | 193 |
| 51 | S25 | 75 | 83 | 1.681 | 1.609 | 1.663 | 173 | 194 |
| 52 | S26 | 82 | 55 | 1.683 | 1.611 | 1.663 | 173 | 193 |

| | MANUFACTURING RESULTS | | | | | | |
|---|---|---|---|---|---|---|---|
| No. | YOUNG'S MODULUS C DIRECTION GPa | X1 VALUE | X2 VALUE | E1 VALUE | E2 VALUE | ROUNDNESS % | NOTE |
| 27 | 177 | 0.845 | 1.065 | 0.876 | 0.843 | 0.021 | COMPARATIVE EXAMPLE |
| 28 | 180 | 0.846 | 1.063 | 0.867 | 0.832 | 0.021 | COMPARATIVE EXAMPLE |
| 29 | 207 | 0.847 | 1.067 | 0.870 | 0.796 | 0.021 | COMPARATIVE EXAMPLE |
| 30 | 203 | 0.852 | 1.077 | 0.862 | 0.788 | 0.022 | COMPARATIVE EXAMPLE |
| 31 | 194 | 0.855 | 1.086 | 0.851 | 0.784 | 0.022 | COMPARATIVE EXAMPLE |
| 32 | 213 | 0.856 | 1.087 | 0.845 | 0.753 | 0.022 | COMPARATIVE EXAMPLE |
| 33 | 200 | 0.857 | 1.086 | 0.840 | 1.022 | 0.022 | COMPARATIVE EXAMPLE |
| 34 | 206 | 0.858 | 1.087 | 0.830 | 1.036 | 0.022 | COMPARATIVE EXAMPLE |
| 35 | 218 | 0.858 | 1.086 | 0.826 | 1.053 | 0.022 | COMPARATIVE EXAMPLE |
| 36 | 180 | 0.834 | 1.039 | 0.950 | 0.905 | 0.020 | COMPARATIVE EXAMPLE |
| 37 | 181 | 0.833 | 1.039 | 0.950 | 0.901 | 0.020 | INVENTIVE EXAMPLE |
| 38 | 182 | 0.835 | 1.039 | 0.934 | 0.907 | 0.020 | INVENTIVE EXAMPLE |
| 39 | 182 | 0.835 | 1.039 | 0.934 | 0.907 | 0.020 | INVENTIVE EXAMPLE |
| 40 | 182 | 0.834 | 1.039 | 0.934 | 0.907 | 0.020 | INVENTIVE EXAMPLE |
| 41 | 182 | 0.834 | 1.039 | 0.934 | 0.907 | 0.020 | INVENTIVE EXAMPLE |
| 42 | — | — | — | — | — | — | COMPARATIVE EXAMPLE |
| 43 | — | — | — | — | — | — | COMPARATIVE EXAMPLE |
| 44 | 180 | 0.832 | 1.039 | 0.956 | 0.907 | 0.020 | INVENTIVE EXAMPLE |
| 45 | 181 | 0.835 | 1.039 | 0.934 | 0.907 | 0.020 | COMPARATIVE EXAMPLE |
| 46 | — | — | — | — | — | — | COMPARATIVE EXAMPLE |
| 47 | — | — | — | — | — | — | COMPARATIVE EXAMPLE |
| 48 | 181 | 0.834 | 1.038 | 0.950 | 0.910 | 0.020 | COMPARATIVE EXAMPLE |
| 49 | 182 | 0.835 | 1.039 | 0.940 | 0.915 | 0.020 | COMPARATIVE EXAMPLE |
| 50 | 180 | 0.834 | 1.038 | 0.956 | 0.912 | 0.020 | COMPARATIVE EXAMPLE |
| 51 | 182 | 0.834 | 1.039 | 0.951 | 0.915 | 0.020 | COMPARATIVE EXAMPLE |
| 52 | 182 | 0.833 | 1.038 | 0.951 | 0.920 | 0.020 | INVENTIVE EXAMPLE |

TABLE 15

| | | | | MANUFACTURING RESULTS | | | | |
|---|---|---|---|---|---|---|---|---|
| | | | | | $B_{50}$ | | YOUNG'S MODULUS | |
| No. | STEEL TYPE | AVERAGE GRAIN SIZE μm | $W_{10/1k}$ W/kg | L DIRECTION T | DIRECTION MAKING ANGLE OF 45° WITH L DIRECTION T | C DIRECTION T | L DIRECTION GPa | DIRECTION MAKING ANGLE OF 45° WITH L DIRECTION GPa |
| 53 | S27 | 85 | 49 | 1.684 | 1.612 | 1.664 | 173 | 196 |
| 54 | S28 | 81 | 54 | 1.685 | 1.612 | 1.666 | 172 | 193 |
| 55 | S29 | 55 | 95 | 1.682 | 1.610 | 1.662 | 172 | 194 |
| 56 | S30 | 56 | 97 | 1.683 | 1.611 | 1.665 | 170 | 193 |
| 57 | S31 | 53 | 93 | 1.682 | 1.609 | 1.663 | 173 | 196 |
| 58 | S32 | 80 | 51 | 1.680 | 1.607 | 1.660 | 171 | 194 |
| 59 | S33 | 80 | 51 | 1.684 | 1.611 | 1.664 | 170 | 193 |
| 60 | S34 | 80 | 51 | 1.683 | 1.610 | 1.663 | 172 | 196 |
| 61 | S35 | 58 | 85 | 1.684 | 1.612 | 1.663 | 171 | 196 |
| 62 | S36 | 80 | 51 | 1.685 | 1.613 | 1.665 | 171 | 195 |
| 63 | S37 | 70 | 51 | 1.695 | 1.618 | 1.670 | 172 | 195 |
| 64 | S38 | — | — | — | — | — | — | — |
| 65 | S39 | 80 | 51 | 1.686 | 1.612 | 1.666 | 169 | 193 |
| 66 | S40 | 80 | 51 | 1.698 | 1.621 | 1.673 | 168 | 191 |
| 67 | S41 | — | — | — | — | — | — | — |
| 68 | S42 | 81 | 50 | 1.686 | 1.613 | 1.665 | 172 | 195 |
| 69 | S43 | 88 | 47 | 1.684 | 1.611 | 1.663 | 172 | 194 |
| 70 | S44 | 58 | 83 | 1.683 | 1.611 | 1.663 | 170 | 195 |
| 71 | S45 | 80 | 84 | 1.682 | 1.610 | 1.663 | 173 | 194 |
| 72 | S46 | 80 | 85 | 1.681 | 1.609 | 1.662 | 172 | 196 |
| 73 | S47 | 80 | 83 | 1.683 | 1.611 | 1.663 | 170 | 194 |
| 74 | S48 | 80 | 84 | 1.686 | 1.613 | 1.665 | 169 | 194 |
| 75 | S49 | 52 | 89 | 1.681 | 1.609 | 1.663 | 171 | 194 |
| 76 | S50 | 80 | 85 | 1.685 | 1.612 | 1.666 | 173 | 196 |
| 77 | S9 | 80 | 39 | 1.675 | 1.613 | 1.663 | 174 | 197 |
| 78 | S9 | 80 | 45 | 1.681 | 1.612 | 1.665 | 172 | 196 |

| | MANUFACTURING RESULTS | | | | | | |
|---|---|---|---|---|---|---|---|
| No. | YOUNG'S MODULUS C DIRECTION GPa | X1 VALUE | X2 VALUE | E1 VALUE | E2 VALUE | ROUNDNESS % | NOTE |
| 53 | 180 | 0.834 | 1.038 | 0.961 | 0.901 | 0.019 | INVENTIVE EXAMPLE |
| 54 | 180 | 0.835 | 1.039 | 0.956 | 0.912 | 0.020 | INVENTIVE EXAMPLE |
| 55 | 181 | 0.833 | 1.039 | 0.950 | 0.910 | 0.020 | COMPARATIVE EXAMPLE |
| 56 | 182 | 0.835 | 1.039 | 0.934 | 0.912 | 0.020 | COMPARATIVE EXAMPLE |
| 57 | 180 | 0.834 | 1.039 | 0.961 | 0.901 | 0.019 | COMPARATIVE EXAMPLE |
| 58 | 182 | 0.883 | 1.039 | 0.940 | 0.910 | 0.020 | COMPARATIVE EXAMPLE |
| 59 | 181 | 0.881 | 1.039 | 0.939 | 0.909 | 0.020 | COMPARATIVE EXAMPLE |
| 60 | 181 | 0.882 | 1.039 | 0.950 | 0.901 | 0.020 | COMPARATIVE EXAMPLE |
| 61 | 182 | 0.835 | 1.038 | 0.940 | 0.901 | 0.020 | COMPARATIVE EXAMPLE |
| 62 | 183 | 0.835 | 1.038 | 0.934 | 0.908 | 0.020 | INVENTIVE EXAMPLE |
| 63 | 182 | 0.839 | 1.040 | 0.945 | 0.908 | 0.020 | INVENTIVE EXAMPLE |
| 64 | — | — | — | — | — | — | COMPARATIVE EXAMPLE |
| 65 | 179 | 0.835 | 1.040 | 0.944 | 0.902 | 0.020 | INVENTIVE EXAMPLE |
| 66 | 177 | 0.841 | 1.040 | 0.949 | 0.903 | 0.020 | INVENTIVE EXAMPLE |
| 67 | — | — | — | — | — | — | COMPARATIVE EXAMPLE |
| 68 | 180 | 0.835 | 1.039 | 0.956 | 0.903 | 0.020 | INVENTIVE EXAMPLE |
| 69 | 183 | 0.834 | 1.039 | 0.940 | 0.915 | 0.020 | INVENTIVE EXAMPLE |
| 70 | 182 | 0.835 | 1.038 | 0.934 | 0.903 | 0.020 | COMPARATIVE EXAMPLE |
| 71 | 181 | 0.834 | 1.039 | 0.956 | 0.912 | 0.020 | COMPARATIVE EXAMPLE |
| 72 | 182 | 0.834 | 1.039 | 0.945 | 0.903 | 0.020 | COMPARATIVE EXAMPLE |
| 73 | 182 | 0.835 | 1.038 | 0.934 | 0.907 | 0.020 | COMPARATIVE EXAMPLE |
| 74 | 181 | 0.836 | 1.039 | 0.934 | 0.902 | 0.020 | COMPARATIVE EXAMPLE |
| 75 | 182 | 0.834 | 1.039 | 0.940 | 0.910 | 0.020 | COMPARATIVE EXAMPLE |
| 76 | 183 | 0.836 | 1.039 | 0.945 | 0.908 | 0.020 | COMPARATIVE EXAMPLE |
| 77 | 185 | 0.831 | 1.035 | 0.941 | 0.911 | 0.020 | INVENTIVE EXAMPLE |
| 78 | 183 | 0.833 | 1.038 | 0.940 | 0.906 | 0.020 | INVENTIVE EXAMPLE |

TABLE 16

| | | | | MANUFACTURING RESULTS | | | | |
|---|---|---|---|---|---|---|---|---|
| | | | | | $B_{50}$ | | YOUNG'S MODULUS | |
| No. | STEEL TYPE | AVERAGE GRAIN SIZE μm | $W_{10/1k}$ W/kg | L DIRECTION T | DIRECTION MAKING ANGLE OF 45° WITH L DIRECTION T | C DIRECTION T | L DIRECTION GPa | DIRECTION MAKING ANGLE OF 45° WITH L DIRECTION GPa |
| 79 | S9 | 80 | 60 | 1.687 | 1.613 | 1.666 | 171 | 194 |
| 80 | S9 | 80 | 80 | 1.689 | 1.612 | 1.663 | 170 | 195 |
| 81 | S9 | 80 | 98 | 1.689 | 1.613 | 1.666 | 169 | 193 |
| 82 | S9 | 20 | 150 | 1.684 | 1.611 | 1.663 | 172 | 196 |
| 83 | S9 | 40 | 75 | 1.685 | 1.613 | 1.666 | 169 | 193 |
| 84 | S9 | 180 | 48 | 1.684 | 1.611 | 1.665 | 168 | 192 |
| 85 | S9 | 220 | 82 | 1.685 | 1.612 | 1.666 | 167 | 191 |
| 86 | S9 | 85 | 48 | 1.709 | 1.599 | 1.671 | 157 | 191 |
| 87 | S9 | 88 | 50 | 1.703 | 1.603 | 1.669 | 159 | 194 |
| 88 | S9 | 83 | 52 | 1.699 | 1.605 | 1.668 | 157 | 195 |
| 89 | S9 | 60 | 87 | 1.715 | 1.597 | 1.665 | 158 | 198 |
| 90 | S51 | 82 | 64 | 1.670 | 1.621 | 1.678 | 171 | 193 |
| 91 | S52 | 85 | 67 | 1.699 | 1.625 | 1.678 | 170 | 194 |
| 92 | S53 | 82 | 61 | 1.699 | 1.622 | 1.677 | 171 | 193 |
| 93 | S54 | 83 | 65 | 1.697 | 1.623 | 1.675 | 173 | 191 |
| 94 | S55 | 84 | 64 | 1.672 | 1.623 | 1.670 | 173 | 194 |
| 95 | S56 | 85 | 63 | 1.670 | 1.624 | 1.677 | 171 | 193 |
| 96 | S57 | 86 | 63 | 1.667 | 1.624 | 1.665 | 172 | 193 |
| 97 | S58 | 84 | 62 | 1.698 | 1.625 | 1.675 | 170 | 191 |
| 98 | S59 | 81 | 64 | 1.699 | 1.628 | 1.677 | 171 | 192 |
| 99 | S60 | 82 | 65 | 1.697 | 1.624 | 1.674 | 169 | 191 |
| 100 | S61 | 83 | 67 | 1.696 | 1.623 | 1.679 | 171 | 193 |
| 101 | S62 | 84 | 65 | 1.671 | 1.621 | 1.677 | 174 | 194 |
| 102 | S63 | 85 | 64 | 1.670 | 1.624 | 1.675 | 173 | 194 |
| 103 | S64 | 82 | 64 | 1.697 | 1.624 | 1.678 | 172 | 193 |
| 104 | S9 | 85 | 50 | 1.714 | 1.596 | 1.678 | 159 | 193 |
| 105 | S65 | 81 | 45 | 1.678 | 1.604 | 1.657 | 171 | 193 |
| 106 | S66 | 83 | 40 | 1.604 | 1.571 | 1.602 | 173 | 194 |

| | MANUFACTURING RESULTS | | | | | | |
|---|---|---|---|---|---|---|---|
| No. | YOUNG'S MODULUS C DIRECTION GPa | X1 VALUE | X2 VALUE | E1 VALUE | E2 VALUE | ROUNDNESS % | NOTE |
| 79 | 180 | 0.835 | 1.039 | 0.950 | 0.905 | 0.020 | INVENTIVE EXAMPLE |
| 80 | 182 | 0.835 | 1.040 | 0.934 | 0.903 | 0.020 | INVENTIVE EXAMPLE |
| 81 | 180 | 0.836 | 1.040 | 0.939 | 0.904 | 0.020 | COMPARATIVE EXAMPLE |
| 82 | 182 | 0.834 | 1.039 | 0.945 | 0.903 | 0.020 | COMPARATIVE EXAMPLE |
| 83 | 180 | 0.835 | 1.039 | 0.939 | 0.904 | 0.020 | INVENTIVE EXAMPLE |
| 84 | 179 | 0.834 | 1.039 | 0.939 | 0.904 | 0.020 | INVENTIVE EXAMPLE |
| 85 | 177 | 0.835 | 1.039 | 0.944 | 0.901 | 0.020 | COMPARATIVE EXAMPLE |
| 86 | 175 | 0.843 | 1.057 | 0.897 | 0.869 | 0.021 | COMPARATIVE EXAMPLE |
| 87 | 181 | 0.841 | 1.052 | 0.878 | 0.876 | 0.021 | COMPARATIVE EXAMPLE |
| 88 | 180 | 0.840 | 1.049 | 0.872 | 0.864 | 0.021 | COMPARATIVE EXAMPLE |
| 89 | 179 | 0.844 | 1.058 | 0.883 | 0.851 | 0.021 | COMPARATIVE EXAMPLE |
| 90 | 183 | 0.832 | 1.033 | 0.934 | 0.917 | 0.020 | INVENTIVE EXAMPLE |
| 91 | 179 | 0.841 | 1.039 | 0.950 | 0.899 | 0.020 | INVENTIVE EXAMPLE |
| 92 | 181 | 0.841 | 1.041 | 0.945 | 0.912 | 0.020 | INVENTIVE EXAMPLE |
| 93 | 182 | 0.840 | 1.039 | 0.951 | 0.929 | 0.020 | INVENTIVE EXAMPLE |
| 94 | 181 | 0.844 | 1.030 | 0.956 | 0.912 | 0.020 | INVENTIVE EXAMPLE |
| 95 | 182 | 0.842 | 1.030 | 0.940 | 0.915 | 0.020 | INVENTIVE EXAMPLE |
| 96 | 183 | 0.844 | 1.026 | 0.940 | 0.920 | 0.020 | INVENTIVE EXAMPLE |
| 97 | 182 | 0.840 | 1.038 | 0.934 | 0.921 | 0.020 | INVENTIVE EXAMPLE |
| 98 | 182 | 0.842 | 1.037 | 0.940 | 0.919 | 0.020 | INVENTIVE EXAMPLE |
| 99 | 181 | 0.840 | 1.038 | 0.934 | 0.916 | 0.020 | INVENTIVE EXAMPLE |
| 100 | 179 | 0.840 | 1.040 | 0.955 | 0.907 | 0.020 | INVENTIVE EXAMPLE |
| 101 | 181 | 0.832 | 1.033 | 0.961 | 0.915 | 0.020 | INVENTIVE EXAMPLE |
| 102 | 180 | 0.831 | 1.030 | 0.961 | 0.910 | 0.020 | INVENTIVE EXAMPLE |
| 103 | 179 | 0.841 | 1.039 | 0.961 | 0.909 | 0.020 | INVENTIVE EXAMPLE |
| 104 | 184 | 0.846 | 1.063 | 0.864 | 0.889 | 0.021 | COMPARATIVE EXAMPLE |
| 105 | 183 | 0.842 | 1.040 | 0.934 | 0.917 | 0.019 | INVENTIVE EXAMPLE |
| 106 | 181 | 0.811 | 1.020 | 0.956 | 0.912 | 0.019 | INVENTIVE EXAMPLE |

INDUSTRIAL APPLICABILITY

According to the above aspects of the present invention, it is possible to provide the non oriented electrical steel sheet with excellent magnetic characteristics and small mechanical anisotropy for the integrally punched iron core, the iron core, the manufacturing method of the iron core, the motor, and the manufacturing method of the motor. Accordingly, the present invention has significant industrial applicability.

REFERENCE SIGNS LIST

1: NON ORIENTED ELECTRICAL STEEL SHEET
L: ROLLING DIRECTION
C: TRANS VERS DIRECTION
D: DIRECTION MAKING ANGLE OF 45° WITH ROLLING DIRECTION

The invention claimed is:

1. A non oriented electrical steel sheet comprising a chemical composition containing, by mass %,
0.005% or less of C,
1.0% or more and 5.0% or less of Si,
less than 2.5% of sol. Al,
3.0% or less of Mn,
0.3% or less of P,
0.01% or less of S,
0.01% or less of N,
0.10% or less of B,
0.10% or less of O,
0.10% or less of Mg,
0.01% or less of Ca,
0.10% or less of Ti,
0.10% or less of V,
5.0% or less of Cr,
5.0% or less of Ni,
5.0% or less of Cu,
0.10% or less of Zr,
0.10% or less of Sn,
0.10% or less of Sb,
0.10% or less of Ce,
0.10% or less of Nd,
0.10% or less of Bi,
0.10% or less of W,
0.10% or less of Mo,
0.10% or less of Nb,
0.10% or less of Y, and
a balance consisting of Fe and impurities, wherein
a sheet thickness is 0.10 mm or more and 0.35 mm or less,
an average grain size is 30 μm or more and 200 μm or less,
an X1 value defined by a following expression 1 is less than 0.845,
an E1 value defined by a following expression 2 is 0.930 or more, and
an iron loss $W_{10/1k}$ when excited so as to be a magnetic flux density of 1.0 T at a frequency of 1 kHz is 80 W/kg or less,
where the expression 1 is $X1=(2\times B_{50L}+B_{50C})/(3\times I_S)$,
where the expression 2 is $E1=E_L/E_C$, and
where $B_{50L}$ denotes a magnetic flux density in a rolling direction when magnetized with a magnetizing force of 5000 A/m, $B_{50C}$ denotes a magnetic flux density in a transverse direction when magnetized with a magnetizing force of 5000 A/m, $I_S$ denotes a spontaneous magnetization at room temperature, $E_L$ denotes a young's modulus in the rolling direction, and $E_C$ denotes a young's modulus in the transverse direction.

2. The non oriented electrical steel sheet according to claim 1, wherein an E2 value defined by a following expression 3 is 0.900 or more,
where the expression 3 is $E2=(E_L+E_C)/2\times E_D$, and
where $E_D$ denotes a young's modulus in a direction making an angle of 45° with the rolling direction.

3. An iron core comprising the non oriented electrical steel sheet according to claim 2.

4. A manufacturing method of an iron core comprising a process of punching and stress-relief-annealing the non oriented electrical steel sheet according to claim 2.

5. A manufacturing method of a motor comprising
a process of preparing an iron core by punching and stress-relief-annealing the non oriented electrical steel sheet according to claim 2 and
a process of assembling the motor using the iron core.

6. The non oriented electrical steel sheet according to claim 1, wherein an X2 value defined by a following expression 4 is 1.040 or less,
where the expression 4 is $X2=(B_{50L}+B_{50C})/2\times B_{50D}$, and
where $B_{50D}$ denotes a magnetic flux density in a direction making an angle of 45° with the rolling direction when magnetized with a magnetizing force of 5000 A/m.

7. An iron core comprising the non oriented electrical steel sheet according to claim 6.

8. A manufacturing method of an iron core comprising a process of punching and stress-relief-annealing the non oriented electrical steel sheet according to claim 6.

9. A manufacturing method of a motor comprising
a process of preparing an iron core by punching and stress-relief-annealing the non oriented electrical steel sheet according to claim 6 and
a process of assembling the motor using the iron core.

10. The non oriented electrical steel sheet according to claim 2, wherein an X2 value defined by a following expression 4 is 1.040 or less,
where the expression 4 is $X2=(B_{50L}+B_{50C})/2\times B_{50D}$, and
where $B_{50D}$ denotes a magnetic flux density in a direction making an angle of 45° with the rolling direction when magnetized with a magnetizing force of 5000 A/m.

11. An iron core comprising the non oriented electrical steel sheet according to claim 10.

12. A manufacturing method of an iron core comprising a process of punching and stress-relief-annealing the non oriented electrical steel sheet according to claim 10.

13. A manufacturing method of a motor comprising
a process of preparing an iron core by punching and stress-relief-annealing the non oriented electrical steel sheet according to claim 10 and
a process of assembling the motor using the iron core.

14. The non oriented electrical steel sheet according to claim 1, wherein the chemical composition contains, by mass %, more than 3.25% and 5.0% or less of Si.

15. An iron core comprising the non oriented electrical steel sheet according to claim 14.

16. A manufacturing method of an iron core comprising a process of punching and stress-relief-annealing the non oriented electrical steel sheet according to claim 14.

17. The non oriented electrical steel sheet according to claim 1, wherein the chemical composition contains, by mass %, at least one of
0.0010% or more and 0.005% or less of C,
0.10% or more and less than 2.5% of sol. Al,
0.0010% or more and 3.0% or less of Mn,
0.0010% or more and 0.3% or less of P,
0.0001% or more and 0.01% or less of S,
0.0015% or more and 0.01% or less of N, 0.0001% or more and 0.10% or less of B,
0.0001% or more and 0.10% or less of O,
0.0001% or more and 0.10% or less of Mg,
0.0003% or more and 0.01% or less of Ca,
0.0001% or more and 0.10% or less of Ti,
0.0001% or more and 0.10% or less of V,
0.0010% or more and 5.0% or less of Cr,
0.0010% or more and 5.0% or less of Ni,
0.0010% or more and 5.0% or less of Cu,
0.0002% or more and 0.10% or less of Zr,
0.0010% or more and 0.10% or less of Sn,
0.0010% or more and 0.10% or less of Sb,
0.001% or more and 0.10% or less of Ce,
0.002% or more and 0.10% or less of Nd,
0.002% or more and 0.10% or less of Bi,
0.002% or more and 0.10% or less of W,
0.002% or more and 0.10% or less of Mo,
0.0001% or more and 0.10% or less of Nb, and
0.002% or more and 0.10% or less of Y.

18. An iron core comprising the non oriented electrical steel sheet according to claim 17.

19. A manufacturing method of an iron core comprising a process of punching and stress-relief-annealing the non oriented electrical steel sheet according to claim 17.

20. The non oriented electrical steel sheet according to claim 1, wherein the chemical composition contains, by mass %, more than 4.0% in total of Si and sol. Al.

21. An iron core comprising the non oriented electrical steel sheet according to claim 20.

22. A manufacturing method of an iron core comprising a process of punching and stress-relief-annealing the non oriented electrical steel sheet according to claim 20.

23. The non oriented electrical steel sheet according to claim 1, wherein the X1 value is 0.80 or more and less than 0.830.

24. An iron core comprising the non oriented electrical steel sheet according to claim 23.

25. A manufacturing method of an iron core comprising a process of punching and stress-relief-annealing the non oriented electrical steel sheet according to claim 23.

26. An iron core comprising the non oriented electrical steel sheet according to claim 1.

27. A manufacturing method of an iron core comprising a process of punching and stress-relief-annealing the non oriented electrical steel sheet according to claim 1.

28. A motor comprising the iron core according to claim 26.

29. A manufacturing method of a motor comprising
a process of preparing an iron core by punching and stress-relief-annealing the non oriented electrical steel sheet according to claim 1 and
a process of assembling the motor using the iron core.

30. A non oriented electrical steel sheet comprising a chemical composition containing, by mass %,
0.005% or less of C,
1.0% or more and 5.0% or less of Si,
less than 2.5% of sol. Al,
3.0% or less of Mn,
0.3% or less of P,
0.01% or less of S,
0.01% or less of N,
0.10% or less of B,
0.10% or less of O,
0.10% or less of Mg,
0.01% or less of Ca,
0.10% or less of Ti,
0.10% or less of V,
5.0% or less of Cr,
5.0% or less of Ni,
5.0% or less of Cu,
0.10% or less of Zr,
0.10% or less of Sn,
0.10% or less of Sb,
0.10% or less of Ce,
0.10% or less of Nd,
0.10% or less of Bi,
0.10% or less of W,
0.10% or less of Mo,
0.10% or less of Nb,
0.10% or less of Y, and
a balance comprising Fe and impurities, wherein
a sheet thickness is 0.10 mm or more and 0.35 mm or less,
an average grain size is 30 μm or more and 200 μm or less,
an X1 value defined by a following expression 1 is less than 0.845,
an E1 value defined by a following expression 2 is 0.930 or more, and
an iron loss $W_{10/1k}$ when excited so as to be a magnetic flux density of 1.0 T at a frequency of 1 kHz is 80 W/kg or less,
where the expression 1 is $X1=(2 \times B_{50L}+B_{50C})/(3 \times Is)$,
where the expression 2 is $E1=E_L/E_C$, and
where $B_{50L}$ denotes a magnetic flux density in a rolling direction when magnetized with a magnetizing force of 5000 A/m, $B_{50C}$ denotes a magnetic flux density in a transverse direction when magnetized with a magnetizing force of 5000 A/m, Is denotes a spontaneous magnetization at room temperature, $E_L$ denotes a young's modulus in the rolling direction, and $E_C$ denotes a young's modulus in the transverse direction.

* * * * *